(12) United States Patent
Lee

(10) Patent No.: US 12,743,393 B2
(45) Date of Patent: Sep. 22, 2026

(54) STORAGE DEVICE INCLUDING A PLURALITY OF INTERFACES, ELECTRONIC DEVICE INCLUDING STORAGE DEVICE, AND DRIVING METHOD OF STORAGE DEVICE

(71) Applicant: Samsung Electronics Co., Ltd., Suwon-si (KR)

(72) Inventor: Seungcheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 18/906,613

(22) Filed: Oct. 4, 2024

(65) Prior Publication Data

US 2025/0209032 A1 Jun. 26, 2025

(30) Foreign Application Priority Data

Dec. 26, 2023 (KR) ........................ 10-2023-0191461

(51) Int. Cl.
*G06F 13/42* (2006.01)

(52) U.S. Cl.
CPC .................... *G06F 13/4221* (2013.01); *G06F 2213/0026* (2013.01)

(58) Field of Classification Search
CPC ..................... G06F 13/4221; G06F 2213/0026
See application file for complete search history.

(56) References Cited

U.S. PATENT DOCUMENTS 7,380,085 B2 5/2008 Matter et al.
10,291,275 B2 5/2019 Lee et al.
10,359,948 B2 7/2019 Goldberg et al.
2005/0030824 A1* 2/2005 Kreuchauf ........... G11C 7/1006 365/232

(Continued)

FOREIGN PATENT DOCUMENTS

CN 116455696 A 7/2023
CN 116594659 A 8/2023

(Continued)

OTHER PUBLICATIONS

Extended European Search Report in European Appln. No. 24216786.4, mailed on Jun. 5, 2025, 9 pages.

*Primary Examiner* — Eric T Oberly
(74) *Attorney, Agent, or Firm* — Fish & Richardson P.C.

(57) ABSTRACT

Some example embodiments provide an electronic device including: a plurality of processors; and a storage device. The storage device includes a first storage interface connected to a first processor among the plurality of processors, a second storage interface connected to a second processor among the plurality of processors, a non-volatile memory, and an interface controller that controls a connection relationship between the first storage interface, the second storage interface, and the non-volatile memory. The first processor, the second processor, and the storage device are on a first substrate. The storage device communicates with the first and second processors via different methods, such that the storage device communicates with the first processor according to a first method and communicates with the second processor according to a second method different from the first method.

20 Claims, 11 Drawing Sheets

(56) References Cited

U.S. PATENT DOCUMENTS

2015/0361918 A1* 12/2015 Park .................... F02D 41/28 123/490
2017/0288717 A1 10/2017 Lee et al.
2019/0065073 A1 2/2019 Goldberg et al.
2020/0065259 A1* 2/2020 Byun .................. G06F 12/1009
2021/0263673 A1* 8/2021 Norman .................. G11C 5/04
2021/0373799 A1* 12/2021 Yan ...................... G06F 3/0604
2022/0086021 A1 3/2022 Philippe et al.
2022/0138000 A1 5/2022 Gepp et al.
2022/0332350 A1 10/2022 Jha et al.
2023/0090429 A1 3/2023 Qi et al.
2024/0020257 A1* 1/2024 Yahya ................ G06F 13/4022

FOREIGN PATENT DOCUMENTS

EP 2261812 B1 8/2015
KR 10-1941938 B1 1/2019
KR 10-2529187 B1 5/2023

* cited by examiner

Figure 3:
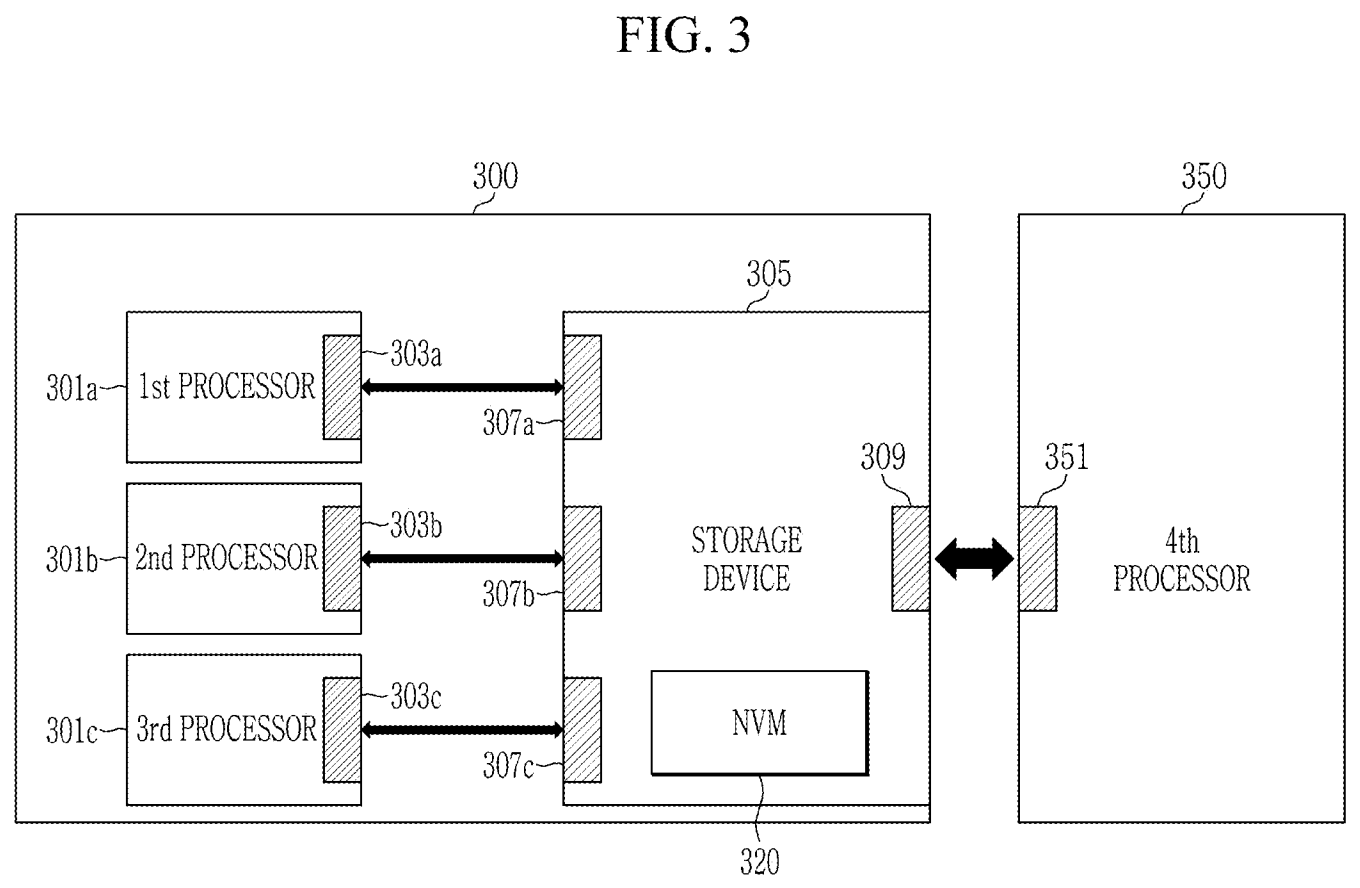

350
4th PROCESSOR
351
309
305
STORAGE DEVICE
NVM
320
300
307a
307b
307c
303a
303b
303c
1st PROCESSOR
2nd PROCESSOR
3rd PROCESSOR
301a
301b
301c 40
401
403
NVM
ADDR
CMD
DATA
450
MEMORY I/F
420
CONTROL UNIT
421
BUFFER MEMORY
440
FTL
430
SEL
413
INTERFACE CONTROLLER
410
1st STORAGE INTERFACE
2nd STORAGE INTERFACE
3rd STORAGE INTERFACE
4th STORAGE INTERFACE
411a
411b
411c
411d

FIG. 5

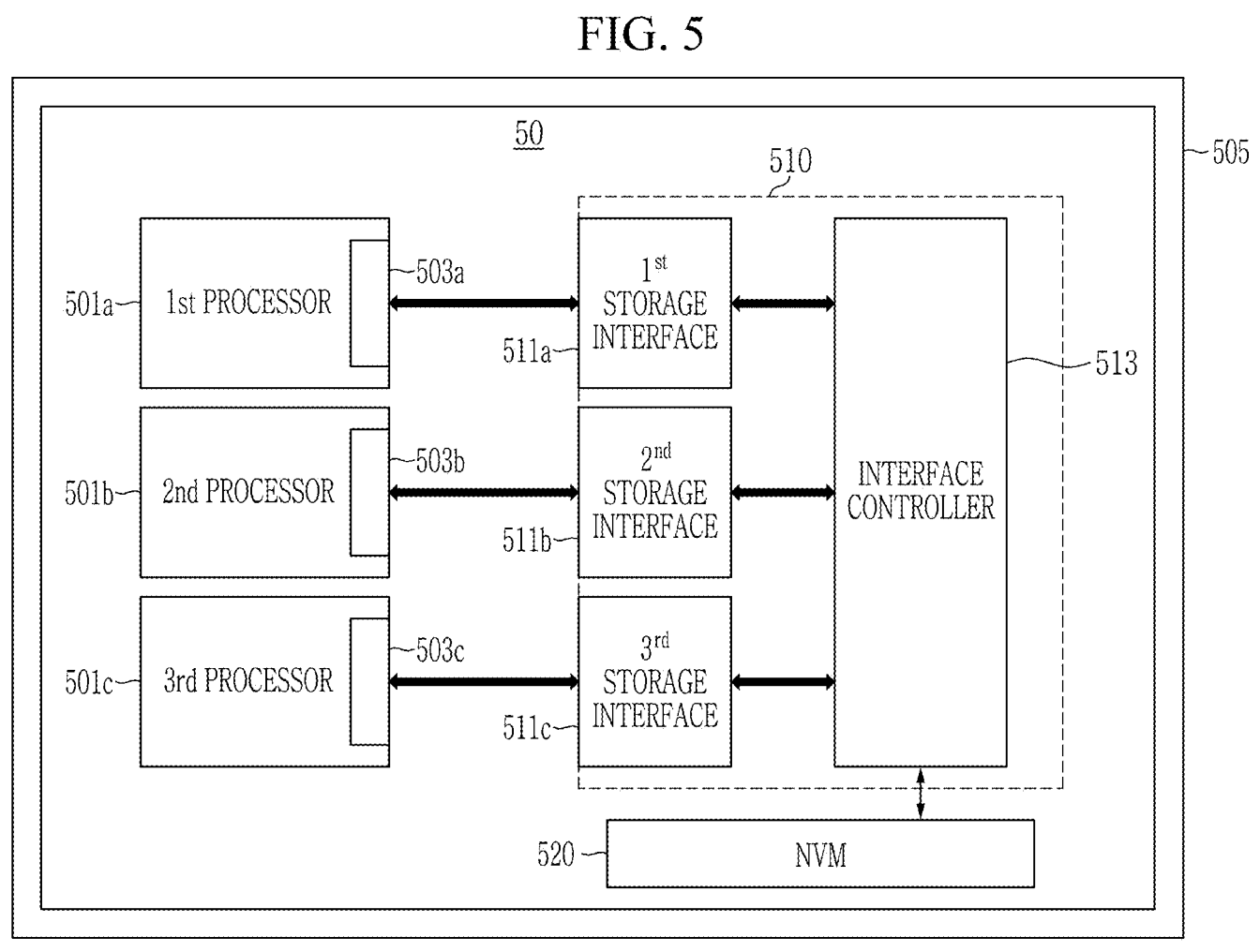

505
50
510
513
INTERFACE CONTROLLER
1st STORAGE INTERFACE
2nd STORAGE INTERFACE
3rd STORAGE INTERFACE
511a
511b
511c
NVM
520
503a
503b
503c
1st PROCESSOR
2nd PROCESSOR
3rd PROCESSOR
501a
501b
501c

FIG. 6

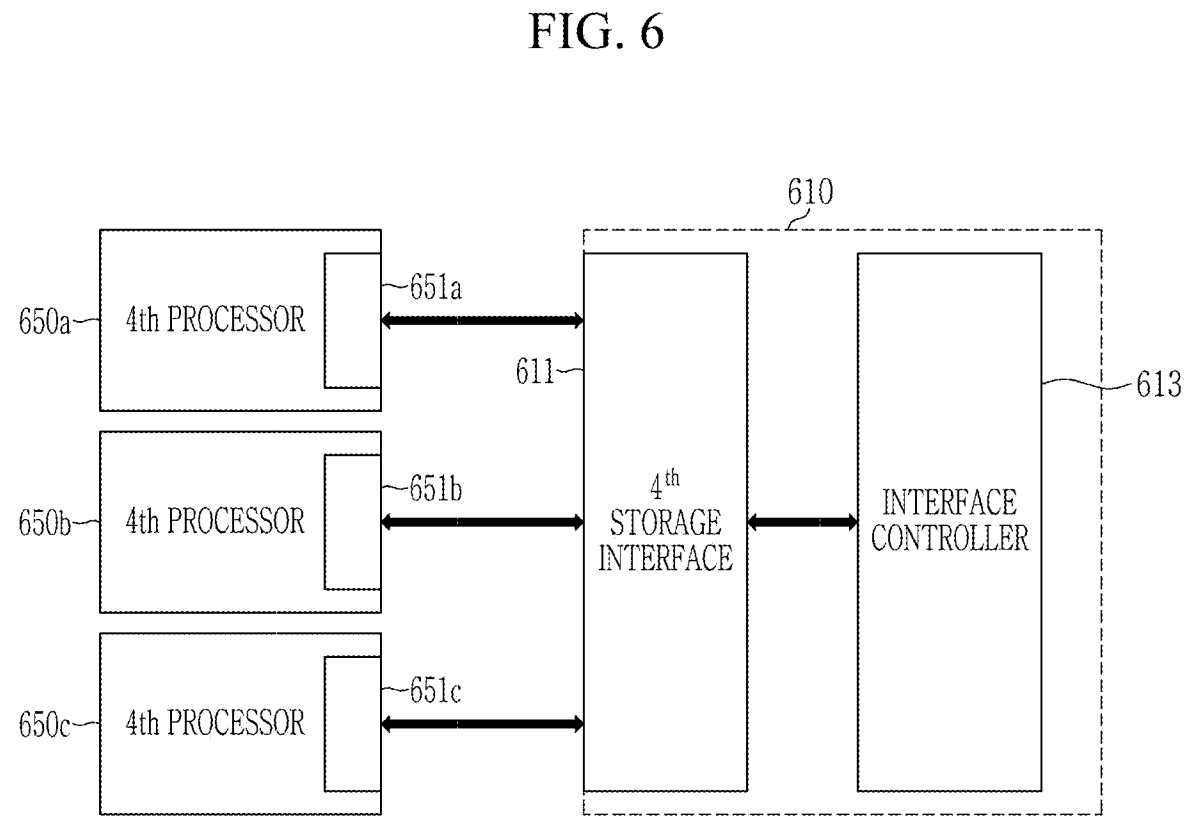

613
INTERFACE CONTROLLER
610
4th STORAGE INTERFACE
611
651a
651b
651c
4th PROCESSOR
4th PROCESSOR
4th PROCESSOR
650a
650b
650c

1st PROCESSOR
2nd PROCESSOR
3rd PROCESSOR
701a
701b
701c
703a
703b
703c
1st STORAGE INTERFACE
2nd STORAGE INTERFACE
3rd STORAGE INTERFACE
711a
711b
711c
710
713
INTERFACE CONTROLLER
711d
4th STORAGE INTERFACE
750a
751a
750b
751b
750c
751c
4th PROCESSOR
4th PROCESSOR
4th PROCESSOR

FIG. 8

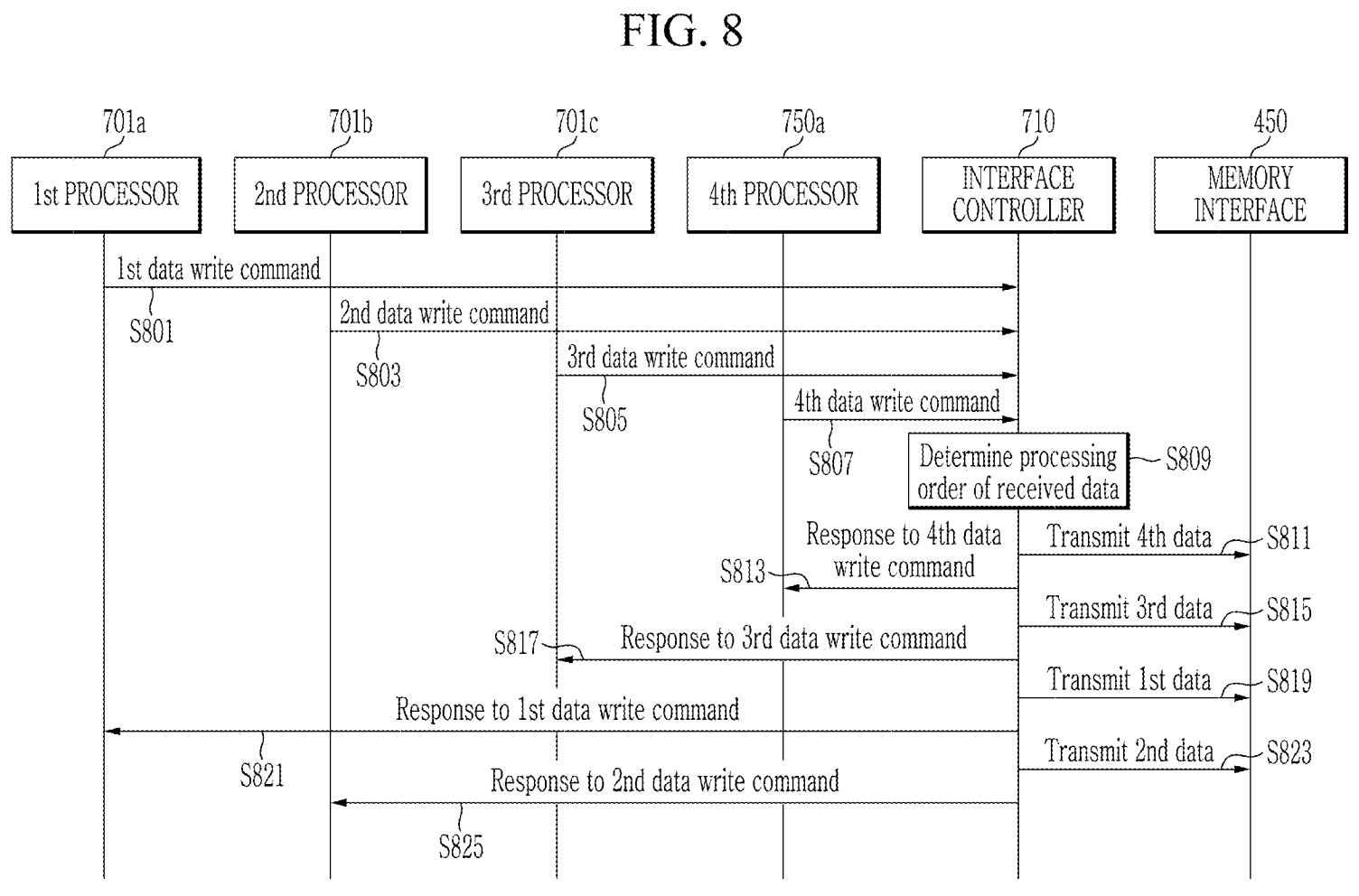

701a 1st PROCESSOR
701b 2nd PROCESSOR
701c 3rd PROCESSOR
750a 4th PROCESSOR
710 INTERFACE CONTROLLER
450 MEMORY INTERFACE

S801 1st data write command
S803 2nd data write command
S805 3rd data write command
S807 4th data write command
S809 Determine processing order of received data
S811 Transmit 4th data
S813 Response to 4th data write command
S815 Transmit 3rd data
S817 Response to 3rd data write command
S819 Transmit 1st data
S821 Response to 1st data write command
S823 Transmit 2nd data
S825 Response to 2nd data write command

Figure 9:
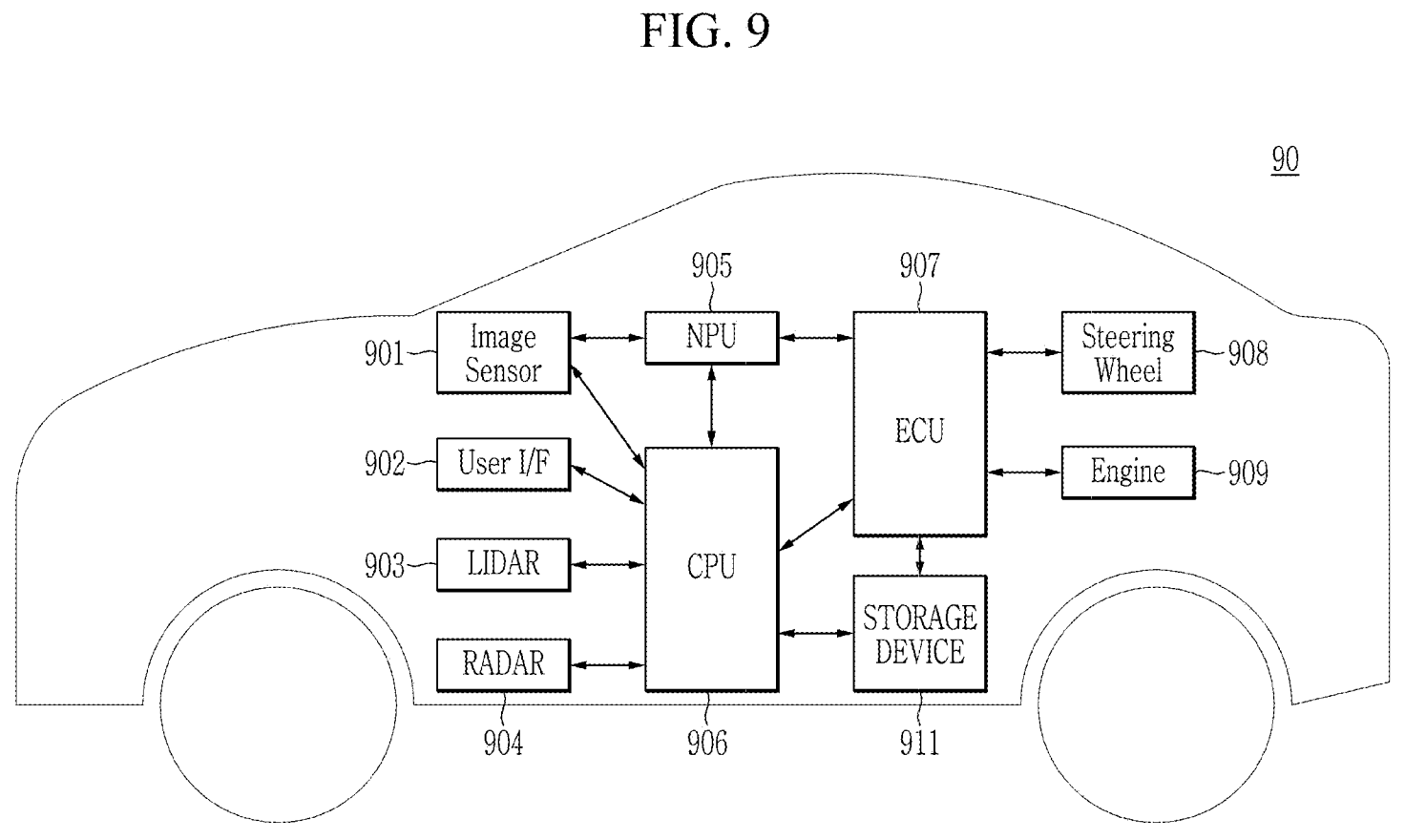

Steering Wheel 908
Engine 909
ECU 907
STORAGE DEVICE 911
NPU 905
CPU 906
Image Sensor 901
User I/F 902
LIDAR 903
RADAR 904

STORAGE DEVICE INCLUDING A PLURALITY OF INTERFACES, ELECTRONIC DEVICE INCLUDING STORAGE DEVICE, AND DRIVING METHOD OF STORAGE DEVICE

CROSS-REFERENCE TO RELATED APPLICATION

This application claims priority to and the benefit of Korean Patent Application No. 10-2023-0191461 filed in the Korean Intellectual Property Office on Dec. 26, 2023, the entire contents of which are incorporated herein by reference.

BACKGROUND

(a) Field

The present inventive concepts relate to storage devices, electronic devices including the storage devices, and driving methods of the storage devices.

(b) Description of the Related Art

In a typical vehicle, a number (quantity) of processors are applied to the powertrain, chassis, body, in-vehicle infotainment (IVI), and advanced driver assistance system (ADAS) to perform various functions. Each processor may include a storage device that stores data required to perform a function and data during an operation.

SUMMARY

Some example embodiments of the inventive concepts provide a storage device that includes a plurality of interfaces. The storage device may be configured to connect (e.g., communicatively and/or electrically couple) with a plurality of processors which may be configured to perform various different functions and which may communicate with the storage device via different methods (e.g., different communication methods corresponding to different communication architectures, standards, or the like), for example different serial communication interfaces corresponding to different serial communication architectures. The storage device may be configured to enable the plurality of processors to share the storage device as a single, common storage device. The storage device may enable the plurality of processors to share data (e.g., one or more particular units of data) stored at one or more particular memory cells of the storage device, such that the plurality of processors may function based on the one or more particular units of data read from one or more particular memory cells of the storage device. As a result, the storage device may mitigate a problem in devices (e.g., vehicles) that include multiple processors that perform various functions and may have separate, respective storage devices but may utilize a same one or more units of data such that redundant data among data used by a plurality of processors must be stored multiple times. Based on enabling the plurality of processors to share the storage device, and in some example embodiments enabling a plurality of processors to function based on using one or more same units of data (e.g., shared data) stored at the storage device, excessively redundant storage of the same one or more units of data at multiple sets of memory cells, storage devices, memories, or the like may be reduced, minimized, or prevented, and thus storage device utilization in the device (e.g., vehicle) may be improved, thereby improving storage capacity of the device (e.g., vehicle), reducing costs (e.g., billing of material costs) and/or complexity of a device including the storage device. As a result, the functionality of the plurality of processors configured to perform various functions and one or more devices (e.g., central controller, vehicle, etc.) including same may be improved.

Some example embodiments provide an electronic device including: a plurality of processors; and a storage device that includes a first storage interface connected to a first processor among the plurality of processors, a second storage interface connected to a second processor among the plurality of processors, a non-volatile memory, and an interface controller configured to control a connection relationship between the first storage interface, the second storage interface, and the non-volatile memory, wherein the first processor, the second processor, and the storage device are disposed on a first substrate, and the storage device is configured to communicate with the first and second processors via different methods, such that the storage device is configured to communicate with the first processor according to a first method and to communicate with the second processor according to a second method different from the first method.

Some example embodiments provide a vehicle storage device including: a non-volatile memory; and a storage controller that includes a first storage interface connected to a first processor among a plurality of processors, a second storage interface connected to a second processor among the plurality of processors and different from the first storage interface, and an interface controller configured to control a connection relationship between the first storage interface, the second storage interface, and the non-volatile memory, wherein the storage device is mounted on a vehicle.

Some example embodiments provide an operating method of a vehicle storage device, including: receiving first data from a first processor among a plurality of processors according to a first method; receiving second data from a second processor among the plurality of processors according to a second method different from the first method; determining a processing order of the first data and the second data; and sequentially writing the first data and the second data to a non-volatile memory based on the processing order.

BRIEF DESCRIPTION OF THE DRAWINGS

FIG. 2 illustrates a central controller according to some example embodiments.

FIG. 3 illustrates a central controller and a fourth processor according to some example embodiments.

FIG. 5 illustrates an interface unit and a processor connected to the interface unit according to some example embodiments.

FIG. 6 illustrates an interface unit and a processor connected to the interface unit according to some example embodiments.

FIG. 8 illustrates an operation method of a system according to FIG. 7 according to some example embodiments.

FIG. 9 illustrates a block diagram of a vehicle according to some example embodiments.

DETAILED DESCRIPTION

Figure 1:
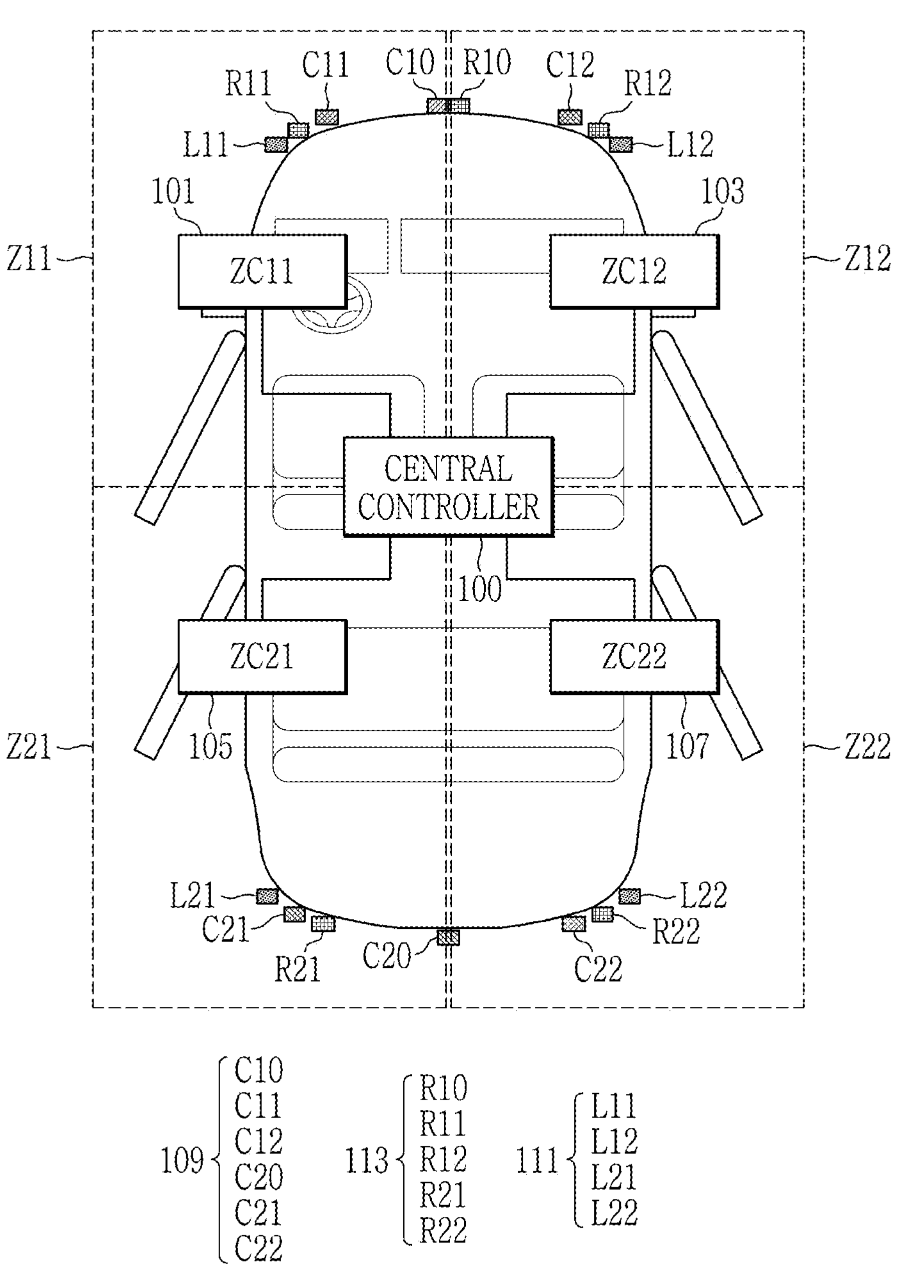
FIG. 1 illustrates a vehicle according to some example embodiments.

The present inventive concepts will be described more fully hereinafter with reference to the accompanying drawings, in which some example embodiments of the inventive concepts are shown. As those skilled in the art would realize, the example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless an explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

FIG. 1 illustrates a vehicle according to some example embodiments.

Referring to FIG. 1, a vehicle 10 may include a plurality of zones Z11, Z12, Z21, and Z22. The vehicle 10 may further include zone controllers 101, 103, 105, and 107 for the plurality of zones Z11, Z12, Z21, and Z22, respectively. The plurality of zone controllers 101, 103, 105, and 107 may control input to and/or output from functional devices and sensors associated with respective zones of the vehicle 10. The functional device and the sensor included in one zone may be controlled by the same zone controller. The functional devices included in different zones may be controlled by different zone controllers. The sensors included in different zones may be controlled by different zone controllers.

FIG. 1 illustrates areas (e.g., contiguous physical regions, contiguous volume regions, etc.) and elements included therein (e.g., devices, sensors, etc.) disposed adjacently in the vehicle 10 as being included in one zone, but the present inventive concepts are not limited thereto, and elements (e.g., devices, sensors, etc.) may be divided into different zones according to the function of each sensor or functional device. For example, functional devices related to driving or braking of a vehicle (for example, engine management, steering, connected brakes, and the like) may be set to be included in one zone and thus may be controlled by a same, particular zone controller. Such functional devices in a same zone may be located in different physical regions or areas of the vehicle. In addition, functional devices related to vehicle convenience (for example, advanced driver assistance systems (ADAS), human-machine-interface (HMI), and the like) may be set in one zone and thus may be controlled by a same, particular zone controller.

The plurality of zone controllers 101, 103, 105, and 107 may be controlled by a central controller 100. That is, the central controller 100 may control the plurality of zone controllers 101, 103, 105, and 107, and the plurality of zone controllers 101, 103, 105, and 107 may control functional devices and sensors included in the corresponding zone.

In FIG. 1, the vehicle 10 is shown as including one central controller 100, but the present inventive concepts are not limited thereto, and the vehicle 10 may include a plurality of central controllers. Each of the plurality of central controllers may control some of the plurality of zone controllers.

The central controller 100 may include a storage device that stores data for controlling the plurality of zone controllers 101, 103, 105, and 107. Each of the plurality of zone controllers 101, 103, 105, and 107 may further include a storage device for storing data for controlling a corresponding functional device and sensor. In some example embodiments, the central controller 100 and the plurality of zone controllers 101, 103, 105, and 107 may share one storage device.

The plurality of zones Z11, Z12, Z21, and Z22 may include a plurality of sensors. For example, the plurality of sensors may include at least one of a plurality of image sensors 109, a plurality of light detection and ranging (LIDAR) sensors 111, or a plurality of radio detecting and ranging (RADAR) sensors 113. Meanwhile, the present inventive concepts are not limited thereto, and the plurality of sensors may further include various sensors (for example, corner radar, rear camera, side camera, and the like) for obtaining environmental information around the vehicle 10.

Each of the plurality of sensors may sense the environment around the vehicle. For example, each of the plurality of sensors may detect other vehicles, pedestrians, bicycles, lanes, road signs, and the like.

The plurality of image sensors 109 may include a first image sensor C10 for sensing a field of view facing toward the front side of the vehicle 10, a second image sensor C11 for sensing a field of view facing toward the left front side, a third image sensor C12 for sensing a field of view facing toward the right front side, a fourth image sensor C20 for sensing a field of view facing toward the rear side, a fifth image sensor C21 for sensing the rear left side, and a sixth image sensor C22 for sensing the rear right side. Each of the plurality of image sensors 109 may capture a direction in which the plurality of image sensors 109 are installed and obtain image data. The image data may include position information about other vehicles, pedestrians, bicycles, lanes, curbs, guardrails, street trees, and streetlights. It will be understood that, as shown, the fourth image sensor C20 as shown in FIG. 1 may be included in either one (or both) of zones Z21 or Z22.

The plurality of LIDAR sensors 111 may include a first LIDAR sensor L11 facing toward the front left of the vehicle 10, a second LIDAR sensor L12 facing toward the front right, a third LIDAR sensor L21 facing toward the rear left, and a fourth LIDAR sensor L22 facing toward the rear right. Each of the plurality of LIDAR sensors 111 may measure a distance to an object by irradiating a laser pulse having a specific frequency as a transmitted wave to the object and measuring a time at which a reflected wave is received from the object. Each of the plurality of LIDAR sensors 111 may obtain LIDAR data based on the transmitted and reflected waves. The LIDAR data may include distance information about the object.

The plurality of RADAR sensors 113 may include a first RADAR sensor R10 having a field of sensing facing toward the front of the vehicle 10, a second RADAR sensor R11 having a field of sensing facing toward the front left, a third RADAR sensor R12 having a field of sensing facing toward the front right, a fourth RADAR sensor R21 having a field of sensing facing toward the rear left, and a fifth RADAR sensor R22 having a field of sensing facing toward the rear right. Each of the plurality of RADAR sensors 113 may include a transmission antenna that emits a RADAR transmission signal at a position where the plurality of RADAR sensors 113 are installed and a reception antenna that receives a RADAR reception signal reflected by an object. Each of the plurality of RADAR sensors 113 may obtain RADAR raw data based on a RADAR transmission signal and a RADAR reception signal. The RADAR raw data may be data obtained by analog-digital conversion of a RADAR reception signal.

Although FIG. 1 illustrates that the vehicle 10 includes four zones, it may include two zones (for example, front/rear or left/right) or three zones (for example, front left/rear right/rear), and may include more zones. It will be understood that the central controller 100 may be implemented by any of the central controllers of any of the example embodiments, including for example central controller 200 and/or 300.

Figure 2:
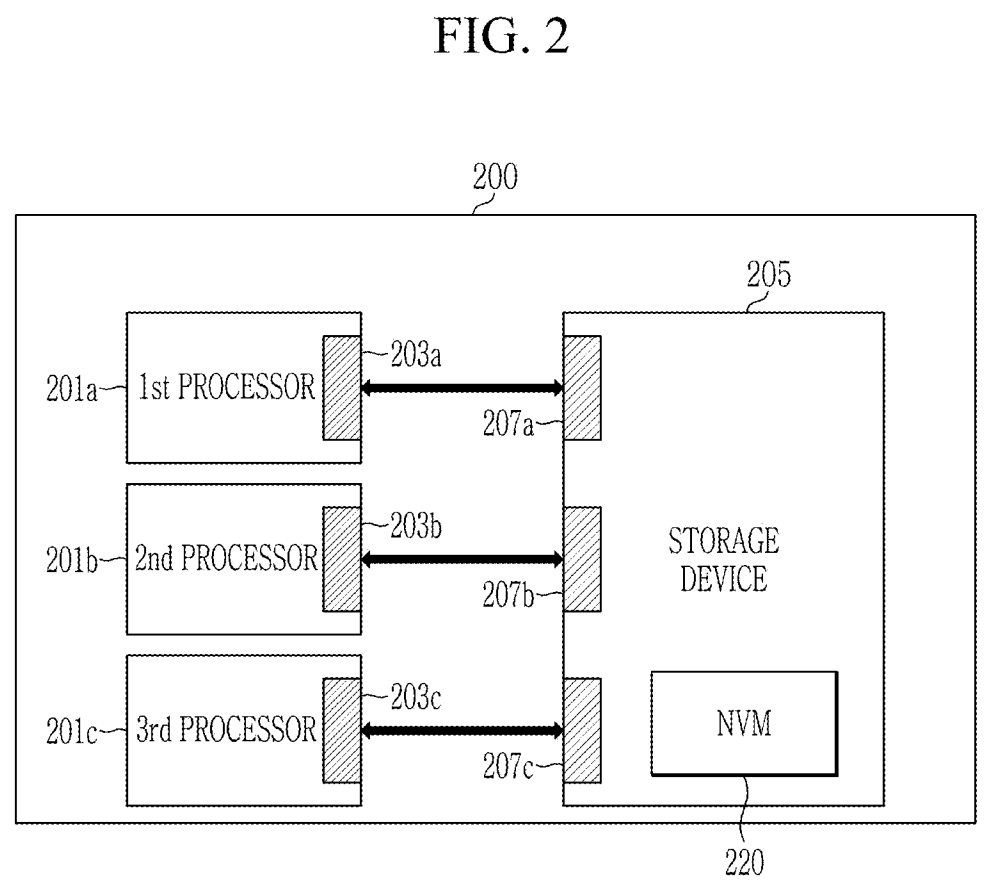

FIG. 2 illustrates a central controller according to some example embodiments.

Specifically, FIG. 2 illustrates an example of a central controller 200 of FIG. 1. Components of the central controller 200 may be disposed on one substrate. In some example embodiments, the substrate may be a printed circuit board (PCB). In some example embodiments, the central controller 200 may be fastened to one housing. The housing may be mounted on a vehicle.

As shown in FIG. 2, the central controller 200 may include a plurality of processors 201*a*, 201*b*, and 201*c* and a storage device 205. Each of the plurality of processors 201*a*, 201*b*, and 201*c* may run firmware and software that execute set functions. The plurality of processors 201*a*, 201*b*, and 201*c* may be configured to execute same or different functions (e.g., sensor device operation, camera operation, radar device, operation, etc.).

The plurality of processors 201*a*, 201*b*, and 201*c* may include processor interfaces 203*a*, 203*b*, and 203*c* for connecting (e.g., configured to communicatively and/or electrically couple) to the storage device 205, respectively. Specifically, the first processor 201*a* may include a first processor interface 203*a* for connecting (e.g., configured to communicatively and/or electrically couple) to the storage device 205. The second processor 201*b* may include a second processor interface 203*b* for connecting (e.g., configured to communicatively and/or electrically couple) to the storage device 205. The third processor 201*c* may include a third processor interface 203*c* for connecting (e.g., configured to communicatively and/or electrically couple) to the storage device 205. In some example embodiments, at least two of the processor interfaces 203*a*, 203*b*, or 203*c* may be different communication interfaces corresponding to (e.g., configured to implement) communication of the respective processor with an external device via different methods, including for example different communication architectures. For example, communication according to different methods as described herein may interchangeably refer to communication using different communication architectures and thus may include communication using different interfaces configured for communication via different communication architectures. For example, at least two of the processor interfaces 203*a*, 203*b*, or 203*c* may be configured to enable communication with an external device via different serial communication architectures, for example PCI Express (PCIe) communication, communication via Universal Flash Storage (UFS) interfaces, Serial Peripheral Interface (SPI) serial communication or any various thereof including for example Extended SPI communication (xSPI), Ethernet communication, or the like. In some example embodiments, at least two of the processor interfaces 203*a*, 203*b*, or 203*c* may be configured to control respective functional devices (e.g., sensor devices, camera devices, radar devices, etc.) using a same one or more units of data.

The storage device 205 may include a plurality of storage interfaces 207*a*, 207*b*, and 207*c*. In some example embodiments, the plurality of storage interfaces 207*a*, 207*b*, and 207*c* may be interfaces for communicating with (e.g., configured to communicatively and/or electrically couple with) the plurality of processors 201*a*, 201*b*, and 201*c*, respectively. The storage device 205 may communicate with the plurality of processors 201*a*, 201*b*, and 201*c* through the plurality of storage interfaces 207*a*, 207*b*, and 207*c* (e.g., the separate, respective storage interfaces 207*a*, 207*b*, and 207*c*) through different methods.

Specifically, the first processor 201*a* may be connected (e.g., communicatively and/or electrically connected) to the storage device 205 through the first storage interface 207*a*. The second processor 201*b* may be connected (e.g., communicatively and/or electrically connected) to the storage device 205 through the second storage interface 207*b*. The third processor 201*c* may be connected (e.g., communicatively and/or electrically connected) to the storage device 205 through the third storage interface 207*c*. The first storage interface 207*a*, the second storage interface 207*b*, and the third storage interface 207*c* may be different interfaces.

Conventionally, each of the plurality of processors disposed in a vehicle includes a storage (e.g., storage device) for storing data for operating the respective processor. Each of the plurality of processors may include a separate, respective (e.g., different) storage device. As storage devices may be separately disposed in the plurality of processors, even if some processors require the same data to control functional devices, the data may be stored in a separate storage (e.g., separate, respective storage devices of the separate, respective processors that are configured to control separate, respective functional devices based at least in part upon the same data).

However, as shown in FIG. 2, the central controller 200 according to some example embodiments may include one storage device 205 connected to all of the plurality of processors 201*a*, 201*b*, and 201*c*. Here, the storage device 205 may include the plurality of storage interfaces 207*a*, 207*b*, and 207*c* corresponding to the plurality of processors 201*a*, 201*b*, and 201*c*, respectively (e.g., configured to communicatively and/or electrically couple the plurality of processors 201*a*, 201*b*, and 201*c*, respectively). Accordingly, the plurality of processors 201*a*, 201*b*, and 201*c* may share one storage device 205, and the plurality of processors 201*a*, 201*b*, and 201*c* may share data necessary to control the corresponding one or more functional devices controlled by the plurality of processors 201*a*, 201*b*, and 201*c*, respectively.

For example, in some example embodiments, where at least two of the processor interfaces 203a, 203b, or 203c may be different communication interfaces corresponding to (e.g., configured to implement) communication of the respective processor with an external device according to different methods (e.g., according to different communication architectures), a corresponding at least two of the plurality of storage interfaces 207a, 207b, or 207c may be different communication interfaces corresponding to (e.g., configured to implement) communication of with respective connected processor interfaces 203a, 203b, or 203c via the respective different methods, for example different communication architectures. For example, the first storage interface 207a may correspond to a same first communication architecture as the first processor interface 203a (e.g., both the first storage interface 207a and the first processor interface 203a may be a USF interface or a PCIe interface) and thus may be configured to connect with the first processor interface 203a and enable the storage device 205 to communicate with the first processor 201a via a first method corresponding to a first communication architecture (e.g., be configured to communicate with the first processor 201a via PCIe communication), while the second storage interface 207b may correspond to a same second communication architecture as the second processor interface 203b (e.g., both the second storage interface 207b and the second processor interface 203b may be a serial peripheral interface (SPI) or an Extended SPI (xSPI) interface) and thus may be configured to connect with the second processor interface 203b and enable the storage device 205 to communicate with the second processor 201b via a second method corresponding to a second communication architecture (e.g., be configured to communicate with the second processor 201b via SPI communication) which is a different method than the first method.

In some example embodiments, the storage device 205 includes at least one non-volatile memory 220, for example a plurality of dies or chips including a memory cell array. For example, the non-volatile memory 220 may include a plurality of chips, and each of the plurality of chips may include a plurality of dies. In some example embodiments, the non-volatile memory 220 may also include a plurality of channels, each of which includes a plurality of chips. The non-volatile memory 220 may include a NAND flash memory. In some example embodiments, the non-volatile memory 220 may include an electrically erasable programmable read-only memory (EEPROM), a phase change random access memory (PRAM), a resistive RAM (ReRAM), a resistance random access memory (RRAM), a nano floating gate memory (NFGM), a polymer random access memory (PoRAM), a magnetic random access memory (MRAM), a ferroelectric random access memory (FRAM), or a similar memory. While the storage device 205 is shown to include a single non-volatile memory 220, it will be understood that example embodiments are not limited thereto and the storage device 205 may include a plurality of non-volatile memories 220, and it will be understood that any description herein with regard to a non-volatile memory 220 may apply equally to a plurality of non-volatile memories 220. Hereinafter, in the present inventive concepts, the non-volatile memory 220 will be described assuming that it is a NAND flash memory device.

It will be understood that the storage device 205 may be configured to enable the plurality of processors 201a, 201b, and 201c to execute one or more functions (e.g., to control separate, respective functional devices of a vehicle) based on using data stored at one or more memory cells of one or more memory cell arrays of the non-volatile memory 220. Accordingly, the non-volatile memory 220 may be considered to be connected (e.g., communicatively and/or electrically coupled) to the plurality of processors 201a, 201b, and 201c via separate, respective storage interfaces 207a, 207b, and 207c. It will be understood that, in some example embodiments, the plurality of processors 201a, 201b, and 201c are connected to the same storage device 205 and are not connected to different storage devices 205, such that the plurality of processors 201a, 201b, and 201c share the storage device 205 and the non-volatile memory 220 thereof.

In some example embodiments, at least two processors of the plurality of processors 201a, 201b, and 201c may be configured to operate using a same one or more units of data (herein referred to herein as shared data), for example ADAS maps and sensor data, that may be stored at a particular one or more memory cells of the non-volatile memory 220, and the storage device 205 may be configured to receive, transmit, and/or communicate the same one or more units of data stored at the particular one or more memory cells of the non-volatile memory 220 from or to the at least two processors of the plurality of processors 201a, 201b, and 201c via respective (e.g., different) methods via respective storage interfaces 207a, 207b, or 207c. As a result, the shared data may be stored at one set of one or more memory cells at a single storage device 205 that may be connected to each of the at least two processors 201a, 201b, or 201c that are configured to use such shared data, for example ADAS maps and sensor data, instead of the shared data being duplicated across multiple sets of memory cells, multiple separate storage devices, or the like. For example, the storage device 205 may map logical block addresses received from at least two of the plurality of processors 201a, 201b, and 201c (e.g., a first logical block address received form the first processor 201a and a second logical block address received from the second processor 201b) to separate, respective physical addresses of the non-volatile memory 220 (e.g., a first physical address of the non-volatile memory 220 and a second physical address of the non-volatile memory 220) using respective address mapping tables corresponding to respective processors. In some example embodiments, the storage device 205 may map logical block addresses received from at least two of the plurality of processors 201a, 201b, and 201c, via respective mapping tables, to at least one same physical address at which data (e.g., shared data) is stored in the non-volatile memory 220. For example, the first and second physical addresses may include a same physical address of at least one memory cell of the non-volatile memory 220. As a result, the storage device 205 may utilize respective mapping tables of at least two of the processors 201a, 201b, and 201c to communicate shared data stored at a same particular set of one or more physical addresses (e.g., one or more particular memory cells) of the non-volatile memory 220 to the at least two processors 201a, 201b, and 201c according to different methods, thereby enable at least two different processors 201a, 201b, or 201c to execute respective functions using a single set of shared data stored at the non-volatile memory 220 of a single storage device 205.

As a result, the storage device 205 may mitigate a problem of storing the shared data used by a plurality of processors 201a, 201b, and 201c at separate, respective storage devices that are not each connected to the plurality of processors 201a, 201b, and 201c via separate, respective storage interfaces 207a, 207b, and 207c. Based on enabling the plurality of processors 201a, 201b, and 201c to share the storage device 205 (and non-volatile memory 220) instead of being connected to separate, respective storage devices, and in some example embodiments enabling a plurality of processors to function based on using a same one or more units of data (e.g., shared data) stored at the storage device, excessively redundant storage of the shared data at multiple sets of memory cells, storage devices, memories, or the like in the central controller 200 may be reduced, minimized, or prevented, and thus storage device utilization in the central controller 200 and any device including same (e.g., a vehicle) may be improved. Thereby, storage capacity of the central controller 200 and any device including same (e.g., a vehicle) may be improved. In addition, based on configuring the central controller 200 to have a single storage device 205 configured to be connected to the plurality of processors 201*a*, 201*b*, and 201*c* and to communicate independently with each of the processors (e.g., via different methods, communication architectures, etc.), and in some example embodiments using shared data from a same non-volatile memory 220 (e.g., same one or more memory cells) of the storage device 205 in communications to different processors 201*a*, 201*b*, and 201*c* to enable the different processors 201*a*, 201*b*, and 201*c* to execute different functions (e.g., control different functional devices), capital costs (e.g., billing of material costs) and complexity of a device including the storage device 205 may be reduced. Additionally excess power consumption associated with storing shared data in multiple separate processors may be reduced, and the like. As a result, the functionality of the central controller 200 (e.g., storage capacity, memory cell utilization without excess and unnecessary redundancy, power consumption efficiency) and/or the costs thereof (e.g., manufacturing costs) may be improved. It will also be understood that a storage device configured to enable communication with a plurality of processors 201*a*, 201*b*, and 201*c* according to different methods (e.g., different communication architectures) using data stored in a same non-volatile memory 220 (which may include shared data) may improve versatility (and reduce complexity) of the central controller 200 based on providing a storage device 205 configured to communicate with multiple different processors according to different communication architectures instead of providing a separate storage device for each separate communication architecture and/or processor.

Meanwhile, in FIG. 2, the central controller 200 is shown as including three processors 201*a*, 201*b*, and 201*c*, but the present inventive concepts are not limited thereto, and the central controller 200 may include any number (quantity) of processors. As also noted above, the storage device 205 is shown as including a single non-volatile memory 220, but example embodiments are not limited thereto, and the storage device 205 may include any number (quantity) of non-volatile memories 220.

FIG. 3 illustrates a central controller and a fourth processor according to some example embodiments.

Specifically, FIG. 3 illustrates an example of a central controller 300 and a fourth processor 350 of FIG. 1. Components of the central controller 300 may be disposed on one substrate. In addition, the fourth processor 350 may be disposed on a separate substrate from the central controller 300. In some example embodiments, the substrate may be a printed circuit board (PCB). In some example embodiments, the central controller 300 and the fourth processor 350 may be fastened to one housing. The housing may be mounted on a vehicle.

As shown in FIG. 3, the central controller 300 may include a plurality of processors 301*a*, 301*b*, 301*c*, and 350 and a storage device 305. Each of the plurality of processors 301*a*, 301*b*, 301*c*, and 350 may run firmware and software that execute set functions.

The plurality of processors 301*a*, 301*b*, 301*c*, and 350 may include processor interfaces 303*a*, 303*b*, 303*c*, and 351 for connecting (e.g., configured to communicatively and/or electrically couple) to the storage device 305. Specifically, the first processor 301*a* may include a first processor interface 303*a* for connecting (e.g., configured to communicatively and/or electrically couple) to the storage device 305. The second processor 301*b* may include a second processor interface 303*b* for connecting (e.g., configured to communicatively and/or electrically couple) to the storage device 305. The third processor 301*c* may include a third processor interface 303*c* for connecting (e.g., configured to communicatively and/or electrically couple) to the storage device 305. The fourth processor 350 may include a fourth processor interface 351, also referred to herein as a zone interface, for connecting e.g., configured to communicatively and/or electrically couple) to the storage device 305. In some example embodiments, the fourth processor 350 may be a zone controller. In some example embodiments, at least two of the processor interfaces 303*a*, 303*b*, 303*c*, or 351 may be different communication interfaces corresponding to (e.g., configured to implement) communication of the respective processor with an external device via different methods, including for example different communication architectures. For example, communication according to different methods as described herein may interchangeably refer to communication using different communication architectures and thus may include communication using different interfaces configured for communication via different communication architectures. For example, at least two of the processor interfaces 303*a*, 303*b*, 303*c*, or 351 may be configured to enable communication with an external device via different serial communication architectures, for example PCI Express (PCIe) communication, communication via Universal Flash Storage (UFS) interfaces, Serial Peripheral Interface (SPI) serial communication or any various thereof including for example Extended SPI communication (xSPI), Ethernet communication, or the like. In some example embodiments, at least two of the processor interfaces 303*a*, 303*b*, 303*c*, or 351 may be configured to control respective functional devices (e.g., sensor devices, camera devices, radar devices, etc.) using a same one or more units of data.

The storage device 305 may include a plurality of storage interfaces 307*a*, 307*b*, 307*c*, and 309. In some example embodiments, the plurality of storage interfaces 307*a*, 307*b*, 307*c*, and 309 may be interfaces for communicating with (e.g., configured to communicatively and/or electrically couple with) the plurality of processors 301*a*, 301*b*, 301*c*, and 350. The storage device 305 may communicate with the plurality of processors 301*a*, 301*b*, 301*c*, and 350 through the plurality of storage interfaces 307*a*, 307*b*, 307*c*, and 309 through different methods. In some example embodiments, the storage device 305 may communicate with the fourth processor 350 through the storage interfaces 307*a*, 307*b*, 307*c*, and 309 (e.g., the separate, respective storage interfaces 307*a*, 307*b*, 307*c*, and 309) through different methods.

Specifically, the first processor 301*a* may be connected (e.g., communicatively and/or electrically connected) to the storage device 305 through the first storage interface 307*a*. The second processor 301*b* may be connected (e.g., communicatively and/or electrically connected) to the storage device 305 through the second storage interface 307*b*. The third processor 301*c* may be connected (e.g., communicatively and/or electrically connected) to the storage device 305 through the third storage interface 307_c_. The fourth processor 350 may be connected (e.g., communicatively and/or electrically connected) to the storage device 305 through the fourth storage interface 309. The first storage interface 307_a_, the second storage interface 307_b_, the third storage interface 307_c_, and the fourth storage interface 309 may be different interfaces.

The fourth processor 350 may include the zone interface 351. The zone interface may include a wired network communication interface. The fourth storage interface 309 and the zone interface 351 may communicate through an Ethernet network. Meanwhile, the present inventive concepts are not limited thereto, and the fourth storage interface 309 and the zone interface 351 may communicate through networks such as local interconnect network (LIN), FlexRay, media oriented systems transport (MOST), and/or low-voltage differential signaling (LVDS).

For example, in some example embodiments, where at least two of the processor interfaces 303_a_, 303_b_, 303_c_, or 351 may be different communication interfaces corresponding to (e.g., configured to implement) communication of the respective processor with an external device according to different methods (e.g., according to different communication architectures), a corresponding at least two of the plurality of storage interfaces 307_a_, 307_b_, 307_c_, or 309 may be different communication interfaces corresponding to (e.g., configured to implement) communication of with respective connected processor interfaces 303_a_, 303_b_, 303_c_, or 351 via the respective different methods, for example different communication architectures. For example, the first storage interface 307_a_ may correspond to a same first communication architecture as the first processor interface 303_a_ (e.g., both the first storage interface 307_a_ and the first processor interface 303_a_ may be a USF interface or a PCIe interface) and thus may be configured to connect with the first processor interface 303_a_ and enable the storage device 305 to communicate with the first processor 301_a_ via a first method corresponding to a first communication architecture (e.g., be configured to communicate with the first processor 301_a_ via PCIe communication), while the second storage interface 307_b_ may correspond to a same second communication architecture as the second processor interface 303_b_ (e.g., both the second storage interface 307_b_ and the second processor interface 303_b_ may be a serial peripheral interface (SPI) or an Extended SPI (xSPI) interface) and thus may be configured to connect with the second processor interface 303_b_ and enable the storage device 305 to communicate with the second processor 301_b_ via a second method corresponding to a second communication architecture (e.g., be configured to communicate with the second processor 301_b_ via SPI communication) which is a different method than the first method.

In some example embodiments, the storage device 305 includes at least one non-volatile memory 320, for example a plurality of dies or chips including a memory cell array. For example, the non-volatile memory 320 may include a plurality of chips, and each of the plurality of chips may include a plurality of dies. In some example embodiments, the non-volatile memory 320 may also include a plurality of channels, each of which includes a plurality of chips. The non-volatile memory 320 may include a NAND flash memory. In some example embodiments, the non-volatile memory 320 may include an electrically erasable programmable read-only memory (EEPROM), a phase change random access memory (PRAM), a resistive RAM (ReRAM), a resistance random access memory (RRAM), a nano floating gate memory (NFGM), a polymer random access memory (PoRAM), a magnetic random access memory (MRAM), a ferroelectric random access memory (FRAM), or a similar memory. While the storage device 305 is shown to include a single non-volatile memory 320, it will be understood that example embodiments are not limited thereto and the storage device 305 may include a plurality of non-volatile memories 320, and it will be understood that any description herein with regard to a non-volatile memory 320 may apply equally to a plurality of non-volatile memories 320. Hereinafter, in the present inventive concepts, the non-volatile memory 320 will be described assuming that it is a NAND flash memory device.

It will be understood that the storage device 305 may be configured to enable the plurality of processors 301_a_, 301_b_, 301_c_, and 350 to execute one or more functions (e.g., to control separate, respective functional devices of a vehicle) based on using data stored at one or more memory cells of one or more memory cell arrays of the non-volatile memory 320. Accordingly, the non-volatile memory 320 may be considered to be connected (e.g., communicatively and/or electrically coupled) to the plurality of processors 301_a_, 301_b_, 301_c_, and 350 via separate, respective storage interfaces 307_a_, 307_b_, 307_c_, and 309. It will be understood that, in some example embodiments, the plurality of processors 301_a_, 301_b_, 301_c_, and 350 are connected to the same storage device 305 and are not connected to different storage devices 305, such that the plurality of processors 301_a_, 301_b_, 301_c_, and 350 share the storage device 305 and the non-volatile memory 320 thereof.

In some example embodiments, at least two processors of the plurality of processors 301_a_, 301_b_, 301_c_, and 350 may be configured to operate using a same one or more units of data (herein referred to herein as shared data) that may be stored at a particular one or more memory cells of the non-volatile memory 320, and the storage device 305 may be configured to communicate the same one or more units of data stored at the particular one or more memory cells of the non-volatile memory 320 to the at least two processors of the plurality of processors 301_a_, 301_b_, 301_c_, and 350 via respective (e.g., different) methods via respective storage interfaces 307_a_, 307_b_, 307_c_, or 309. As a result, the shared data may be stored at one set of one or more memory cells at a single storage device 305 that may be connected to each of the at least two processors 301_a_, 301_b_, 301_c_, or 350 that are configured to use such shared data, instead of the shared data being duplicated across multiple sets of memory cells, multiple separate storage devices, or the like. For example, the storage device 305 may map logical block addresses received from at least two of the plurality of processors 301_a_, 301_b_, 301_c_, and 350 (e.g., a first logical block address received form the first processor 301_a_ and a second logical block address received from the second processor 301_b_) to separate, respective physical addresses of the non-volatile memory 320 (e.g., a first physical address of the non-volatile memory 320 and a second physical address of the non-volatile memory 320) using respective address mapping tables corresponding to respective processors. In some example embodiments, the storage device 305 may map logical block addresses received from at least two of the plurality of processors 301_a_, 301_b_, 301_c_, and 350, via respective mapping tables, to at least one same physical address at which data (e.g., shared data) is stored in the non-volatile memory 320. For example, the first and second physical addresses may include a same physical address of at least one memory cell of the non-volatile memory 320. As a result, the storage device 305 may utilize respective mapping tables of at least two of the processors 301*a*, 301*b*, 301*c*, and 350 to communicate shared data stored at a same particular set of one or more physical addresses (e.g., one or more particular memory cells) of the non-volatile memory 320 to the at least two processors 301*a*, 301*b*, 301*c*, or 350 according to different methods, thereby enable at least two different processors 301*a*, 301*b*, 301*c*, or 350 to execute respective functions using a single set of shared data stored at the non-volatile memory 320 of a single storage device 305.

As a result, the storage device 305 may mitigate a problem of storing the shared data used by a plurality of processors 301*a*, 301*b*, 301*c*, and 350 at separate, respective storage devices that are not each connected to the plurality of processors 301*a*, 301*b*, 301*c*, and 350 via separate, respective storage interfaces 307*a*, 307*b*, 307*c*, and 309. Based on enabling the plurality of processors 301*a*, 301*b*, 301*c*, and 350 to share the storage device 305 (and non-volatile memory 320) instead of being connected to separate, respective storage devices, and in some example embodiments enabling a plurality of processors to function based on using a same one or more units of data (e.g., shared data) stored at the storage device, excessively redundant storage of the shared data at multiple sets of memory cells, storage devices, memories, or the like in the central controller 300 may be reduced, minimized, or prevented, and thus storage device utilization in the central controller 300 and any device including same (e.g., a vehicle) may be improved. Thereby, storage capacity of the central controller 200 and any device including same (e.g., a vehicle) may be improved. In addition, based on configuring the central controller 200 to have a single storage device 305 configured to be connected to the plurality of processors 301*a*, 301*b*, and 301*c* and to communicate independently with each of the processors (e.g., via different methods, communication architectures, etc.), and in some example embodiments using shared data from a same non-volatile memory 320 (e.g., same one or more memory cells) of the storage device 305 in communications to different processors 301*a*, 301*b*, 301*c*, and 350 to enable the different processors 301*a*, 301*b*, 301*c*, and 350 to execute different functions (e.g., control different functional devices), capital costs (e.g., billing of material costs) and complexity of a device including the storage device 305 may be reduced. Additionally excess power consumption associated with storing shared data in multiple separate processors may be reduced, and the like. As a result, the functionality of the central controller 300 (e.g., storage capacity, memory cell utilization without excess and unnecessary redundancy, power consumption efficiency) and/or the costs thereof (e.g., manufacturing costs) may be improved.

Meanwhile, FIG. 3 illustrates that the storage device 305 is connected to the fourth processor 350, but the present inventive concepts are not limited thereto, and the storage device 305 may be connected to a plurality of fourth processors 350. As also noted above, the storage device 305 is shown as including a single non-volatile memory 320, but example embodiments are not limited thereto, and the storage device 305 may include any number (quantity) of non-volatile memories 320. It will also be understood that a storage device configured to enable communication with a plurality of processors 301*a*, 301*b*, 301*c*, and 350 according to different methods (e.g., different communication architectures) using data stored in a same non-volatile memory 320 (which may include shared data) may improve versatility (and reduce complexity) of the central controller 300 based on providing a storage device 305 configured to communicate with multiple different processors according to different communication architectures instead of providing a separate storage device for each separate communication architecture and/or processor.

Figure 4:
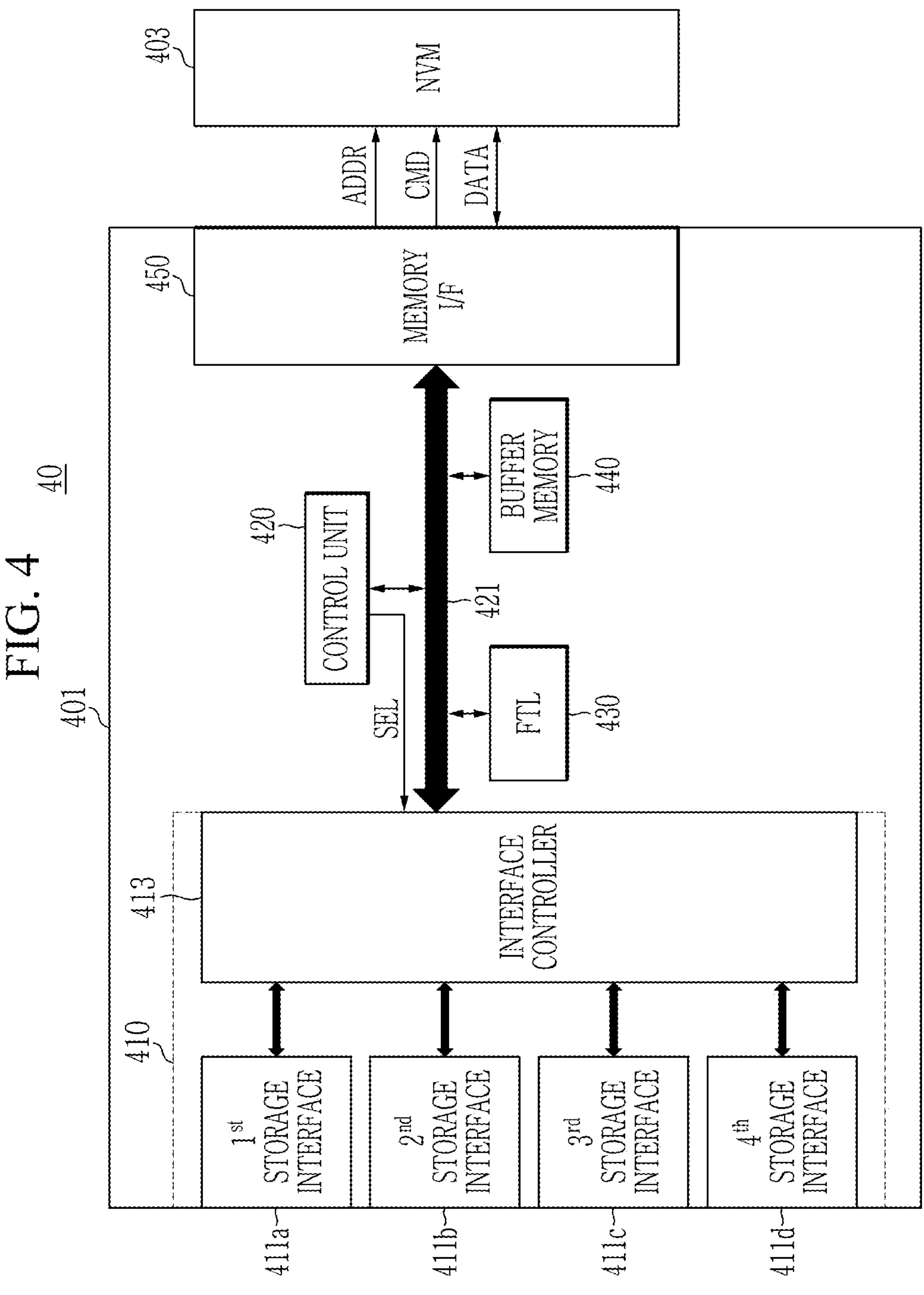
FIG. 4 illustrates a storage device according to some example embodiments.

FIG. 4 illustrates a storage device according to some example embodiments.

Referring to FIG. 4 together, a storage device 40 may include a storage controller 401 and a non-volatile memory 403. It will be understood that the storage device 40 and the elements thereof (e.g., storage controller 401, non-volatile memory 403, etc.) may be included in and/or may implement any of the storage devices of any of the example embodiments (e.g., any of the storage devices 205, 305, 505, 911, or the like).

The storage controller 401 may control an operation of the storage device 40. For example, the storage controller 401 may provide an address ADDR, a command CMD, and the like to the non-volatile memory 403 based on the control of an external device. The storage controller 401 may provide signals to the non-volatile memory 403 to write data DATA to the non-volatile memory 403 or read data DATA from the non-volatile memory 403.

The non-volatile memory 403 may include a plurality of dies or chips including a memory cell array. For example, the non-volatile memory 403 may include a plurality of chips, and each of the plurality of chips may include a plurality of dies. In some example embodiments, the non-volatile memory 403 may also include a plurality of channels, each of which includes a plurality of chips.

The non-volatile memory 403 may include a NAND flash memory. In some example embodiments, the non-volatile memory 403 may include an electrically erasable programmable read-only memory (EEPROM), a phase change random access memory (PRAM), a resistive RAM (ReRAM), a resistance random access memory (RRAM), a nano floating gate memory (NFGM), a polymer random access memory (PoRAM), a magnetic random access memory (MRAM), a ferroelectric random access memory (FRAM), or a similar memory. Hereinafter, in the present inventive concepts, the non-volatile memory 403 will be described assuming that it is a NAND flash memory device.

The storage controller 401 may include an interface unit 410, a control unit 420, a flash translation layer (FTL) 430, a buffer memory 440, a memory interface 450, and the like. The interface unit 410 (e.g., interface controller 413), the control unit 420, the FTL 430, the buffer memory 440, and the memory interface 450 may be connected via a communication bus 421.

The control unit 420 may control overall operations of the storage controller 401. The control unit 420 may control the storage controller 401 by running the firmware loaded in the FTL 430. In some example embodiments, the control unit 420 may include a central processing unit (CPU), a controller, or an application specific integrated circuit (ASIC).

The control unit 420 may run various firmware or software driven by the storage controller 401.

The control unit 420 may select at least one processor, for example based on selecting at least one storage interface among a plurality of storage interfaces 411*a*, 411*b*, 411*c*, and 411*d*. The control unit 420 may generate a selection signal SEL that controls the interface controller 413 to receive a command and/or data from the selected processor. The control unit 420 may transmit the selection signal SEL to the interface controller 413 (e.g., via communication bus 421). That is, the control unit 420 may select a processor to be connected among processors respectively connected to the plurality of storage interfaces 411*a*, 411*b*, 411*c*, and 411*d*, and generate the selection signal SEL for controlling the interface controller 413 to receive a command and/or data from the selected processor.

The control unit 420 may use the buffer memory 440 as an operation memory of the control unit 420. In addition, the control unit 420 may use the non-volatile memory 403 as an operation memory of the control unit 420. For example, the control unit 420 may control a data read operation from the non-volatile memory 403 and a data program operation to the non-volatile memory 403 by executing firmware.

The interface unit 410 may include the plurality of storage interfaces 411*a*, 411*b*, 411*c*, and 411*d* and an interface controller 413.

Each of the plurality of storage interfaces 411*a*, 411*b*, 411*c*, and 411*d* may transmit and receive packets to and from a separate, respective set of one or more processors. In some example embodiments, the separate, respective sets of one or more processors may be an MCU, an AP, an SoC, a zone controller, or the like. The packets received from the separate, respective sets of one or more processors through the storage interfaces 411*a*, 411*b*, 411*c*, and 411*d* may include commands or data to be written to the non-volatile memory 403. The packets transmitted to the processor from the storage interfaces 411*a*, 411*b*, 411*c*, and 411*d* may include a response to a command or data read from the non-volatile memory 403.

The interface controller 413 may select a processor to which the storage device 40 is connected based on the control of the control unit 420. The interface controller 413 may control a particular storage interface corresponding to (e.g., communicatively and/or electrically coupled with) the selected processor among the plurality of storage interfaces 411*a*, 411*b*, 411*c*, and 411*d* to be connected to the memory interface 450. For example, the storage device 40 may receive a command and/or data through the storage interface corresponding to the selected processor. For example, the storage device 40 may transmit a response or data read from the non-volatile memory 403 through the storage interface corresponding to the selected processor.

Meanwhile, for better understanding and ease of description, the interface controller 413 is described as controlling one storage interface (e.g., a selected storage interface) corresponding to the selected processor among the plurality of storage interfaces 411*a*, 411*b*, 411*c*, and 411*d* to be connected to the memory interface 450, but the present inventive concepts are not limited thereto. In some example embodiments, the interface controller 413 may control at least one of the plurality of storage interfaces 411*a*, 411*b*, 411*c*, or 411*d* to be connected to the memory interface 450. In this case, the interface controller 413 may determine a processing order of commands and/or data received from the plurality of processors, and process the received commands and/or data according to the processing order.

The memory interface 450 may provide signal transmission and reception with the non-volatile memory 403. The memory interface 450 may transmit the command CMD to the non-volatile memory 403 together with data DATA to be written to the non-volatile memory 403, or may receive read data DATA from the non-volatile memory 403. This memory interface 450 may be implemented to comply with standard protocols such as Toggle or ONFI.

The FTL 430 may include firmware or software that manages data writing, data reading, and sub-blocking, and/or block erasing operations of the non-volatile memory 403. The firmware of the FTL 430 may be executed by the control unit 420. In some example embodiments, the FTL 430 may be implemented through hardware automation circuits configured to perform various maintenance operations. For example, the FTL 430 may perform various functions such as address mapping, wear-leveling, and garbage collection.

The FTL 430 may perform an address mapping operation of changing a logical block address received from an external device into a physical address used to actually store data in the non-volatile memory 403. For example, the external device may be a plurality of processors. Specifically, the FTL 430 may map the logical block address received from the external device and the physical address of the non-volatile memory 403 using an address mapping table. The address mapping operation may be an operation of converting or mapping between the logical block address and the physical address of the non-volatile memory 403.

The FTL 430 may generate a mapping table for each of the plurality of storage interfaces 411*a*, 411*b*, 411*c*, and 411*d*. That is, the FTL 430 may generate a separate mapping table for each of a plurality of processors to which the storage device 40 is connected. For example, when (e.g., based on) the interface controller 413 connects the first storage interface 411*a* and the storage device 40, the FTL 430 may perform a mapping operation based on the first mapping table. For example, when (e.g., based on) the interface controller 413 connects the second storage interface 411*b* and the storage device 40, the FTL 430 may perform a mapping operation based on a second mapping table different from the first mapping table.

The buffer memory 440 may store instructions and data that are executed and processed by the storage controller 401. The buffer memory 440 may temporarily store data stored or to be stored in the non-volatile memory 403.

The buffer memory 440 may be implemented as a volatile memory such as a dynamic random access memory (DRAM) and a static RAM (SRAM). However, it is not limited thereto, and the buffer memory 440 may be implemented as a resistive non-volatile memory, such as a magnetic RAM (MRAM), a phase change RAM (PRAM), or a resistive RAM (ReRAM), or various types of non-volatile memories, such as a flash memory, a nano floating gate memory (NFGM), a polymer random access memory (PoRAM), or a ferroelectric random access memory (FRAM).

In FIG. 4, the buffer memory 440 is shown as being provided inside the storage controller 401, but the present inventive concepts are not limited thereto, and the buffer memory 440 may be provided outside the storage controller 401.

In some example embodiments, at least two of the storage interfaces 411*a*, 411*b*, 411*c*, or 411*d* may be different communication interfaces corresponding to (e.g., configured to implement) communication with an external device via different methods, including for example different communication architectures. For example, communication according to different methods as described herein may interchangeably refer to communication using different communication architectures and thus may include communication using different interfaces configured for communication via different communication architectures. For example, at least two of the storage interfaces 411*a*, 411*b*, 411*c*, or 411*d* may be configured to enable communication with an external device via different serial communication architectures, for example PCI Express (PCIe) communication, communication via Universal Flash Storage (UFS) interfaces, Serial Peripheral Interface (SPI) serial communication or any various thereof including for example Extended SPI communication (xSPI), Ethernet communication, or the like.

For example, the first storage interface 411*a* may correspond to a same first communication architecture as a corresponding first processor interface of a first processor (e.g., both the first storage interface 411*a* and the first processor interface may be a USF interface or a PCIe interface) and thus may be configured to connect with the first processor interface and enable the storage device 40 to communicate with the first processor via a first method corresponding to a first communication architecture (e.g., be configured to communicate with the first processor via PCIe communication), while the second storage interface 411*b* may correspond to a same second communication architecture as a second processor interface of a second processor (e.g., both the second storage interface 411*b* and the second processor interface may be a serial peripheral interface (SPI) or an Extended SPI (xSPI) interface) and thus may be configured to connect with the second processor interface and enable the storage device 40 to communicate with the second processor via a second method corresponding to a second communication architecture (e.g., be configured to communicate with the second processor via SPI communication) which is a different method than the first method.

It will be understood that the storage device 40 may be configured to enable a plurality of processors connected to separate, respective storage interfaces 411*a*, 411*b*, 411*c*, and 411*d* to execute one or more functions (e.g., to control separate, respective functional devices of a vehicle) based on using data stored at one or more memory cells of one or more memory cell arrays of the non-volatile memory 403. Accordingly, the non-volatile memory 403 may be considered to be connected (e.g., communicatively and/or electrically coupled) to the plurality of processors via separate, respective storage interfaces 411*a*, 411*b*, 411*c*, and 411*d*. It will be understood that, in some example embodiments, the plurality of processors are connected to the same storage device 40 and are not connected to different storage devices 40, such that the plurality of processors share the storage device 40 and the non-volatile memory 403 thereof.

In some example embodiments, at least two processors of the plurality of processors connected to separate, respective storage interfaces 411*a*, 411*b*, 411*c*, and 411*d* may be configured to operate using a same one or more units of data (herein referred to herein as shared data) that may be stored at a particular one or more memory cells of the non-volatile memory 403, and the storage device 40 may be configured to communicate the same one or more units of data stored at the particular one or more memory cells of the non-volatile memory 403 to the at least two processors of the plurality of processors via respective (e.g., different) methods via respective storage interfaces 411*a*, 411*b*, 411*c*, and 411*d*. As a result, the shared data may be stored at one set of one or more memory cells at a single storage device 40 that may be connected to each of the at least two processors that are configured to use such shared data, instead of the shared data being duplicated across multiple sets of memory cells, multiple separate storage devices, or the like. For example, the storage device 40 may map logical block addresses received from at least two of the plurality of processors (e.g., a first logical block address received form the first processor and a second logical block address received from the second processor) to separate, respective physical addresses of the non-volatile memory 403 (e.g., a first physical address of the non-volatile memory 403 and a second physical address of the non-volatile memory 403) using respective address mapping tables corresponding to respective processors. In some example embodiments, the storage device 40 may map logical block addresses received from at least two of the plurality of processors, via respective mapping tables, to at least one same physical address at which data (e.g., shared data) is stored in the non-volatile memory 403. For example, the first and second physical addresses may include a same physical address of at least one memory cell of the non-volatile memory 403. As a result, the storage device 40 may utilize respective mapping tables of at least two of the processors to communicate shared data stored at a same particular set of one or more physical addresses (e.g., one or more particular memory cells) of the non-volatile memory 403 to the at least two processors according to different methods, thereby enable at least two different processors to execute respective functions using a single set of shared data stored at the non-volatile memory 403 of a single storage device 40.

As a result, the storage device 40 may mitigate a problem of storing the shared data used by a plurality of processors at separate, respective storage devices that are not each connected to the plurality of processors via separate, respective storage interfaces 411*a*, 411*b*, 411*c*, and 411*d*. Based on enabling the plurality of processors to share the storage device 40 (and non-volatile memory 403) instead of being connected to separate, respective storage devices, and in some example embodiments enabling a plurality of processors to function based on using a same one or more units of data (e.g., shared data) stored at the storage device, excessively redundant storage of the shared data at multiple sets of memory cells, storage devices, memories, or the like in a central controller that includes the storage device 40 may be reduced, minimized, or prevented, and thus storage device utilization in the central controller and any device including same (e.g., a vehicle) may be improved. Thereby, storage capacity of a device that includes the storage device 40 may be improved. In addition, based on the single storage device 40 being configured to be connected to the plurality of processors via separate, respective storage interfaces 411*a*, 411*b*, 411*c*, and 411*d* and to communicate independently with each of the processors (e.g., via different methods, communication architectures, etc.), and in some example embodiments using shared data from a same non-volatile memory 403 (e.g., same one or more memory cells) of the storage device 40 in communications to different processors to enable the different processors to execute different functions (e.g., control different functional devices), capital costs (e.g., billing of material costs) and complexity of a device including the storage device 40 may be reduced. Additionally excess power consumption associated with storing shared data in multiple separate processors may be reduced, and the like. As a result, the functionality of a device that includes the storage device 40 (e.g., storage capacity, memory cell utilization without excess and unnecessary redundancy, power consumption efficiency) and/or the costs thereof (e.g., manufacturing costs) may be improved. It will also be understood that a storage device configured to enable communication with a plurality of processors according to different methods (e.g., different communication architectures) using data stored in a same non-volatile memory 403 (which may include shared data) may improve versatility (and reduce complexity) of a device (e.g., central controller) including the storage device 40 based on the storage device 40 being configured to communicate with multiple different processors according to different communication architectures instead of providing a separate storage device for each separate communication architecture and/or processor.

FIG. 5 illustrates an interface unit and a processor connected to the interface unit according to some example embodiments.

Specifically, FIG. 5 illustrates a plurality of processors 501*a*, 501*b*, and 501*c* disposed on a first substrate 50 and an interface unit 510 of a storage device 505 connected to the plurality of processors 501*a*, 501*b*, and 501*c*.

In some example embodiments, the first processor 501*a* may be an SoC processor. The first processor 501*a* may be connected (e.g., communicatively and/or electrically coupled) to the storage device through a first processor interface 503*a*. For example, the first processor interface 503*a* may be a UFS interface, a PCIe interface, or the like.

In some example embodiments, the second processor 501*b* may be a micro control unit (MCU). The second processor 501*b* may be connected (e.g., communicatively and/or electrically coupled) to the storage device through a second processor interface 503*b*. For example, the second processor interface 503*b* may be a serial peripheral interface (SPI) or an extended SPI (xSPI). Communication via the SPI interface (e.g., communication according to a method via the SPI interface) may be a synchronous communication method synchronized through a clock for serial communication with an external device of the second processor 501*b*.

Specifically, the SPI interface may include a serial clock line, a master out slave input (MOSI) line for transmitting data from the second processor 501*b* to the interface unit 510, a master input slave out (MISO) line for transmitting data from the interface unit 510 to the second processor 501*b*, and a slave select (SS) line for selecting a target to communicate with the second processor 501*b*. The speed of the serial clock may be set based on a communication band with the interface unit 510 and a delay generated when communicating with the interface unit 510.

In some example embodiments, the third processor 501*c* may be an application processor (AP). The third processor 501*c* may be connected (e.g., communicatively and/or electrically coupled) to the interface unit 510 through a third processor interface 503*c*. For example, the third processor interface 503*c* may be an automotive Ethernet interface, a PCIe interface, or the like.

The interface unit 510 may include a first storage interface 511*a*, a second storage interface 511*b*, a third storage interface 511*c*, and an interface controller 513 for controlling the storage interfaces 511*a*, 511*b*, and 511*c*. In some example embodiments, the first storage interface 511*a* may be an interface for connecting (e.g., configured to communicatively and/or electrically couple) to the first processor 501*a*. For example, the first storage interface 511*a* may be a UFS interface or a PCIe interface for connecting the first processor 501*a*. In some example embodiments, the second storage interface 511*b* may be an interface for connecting (e.g., configured to communicatively and/or electrically couple) to the second processor 501*b*. For example, the second storage interface 511*b* may be an SPI interface for connecting to the second processor 501*b*. Meanwhile, in FIG. 5, the storage device is shown as being connected to one second processor 501*b*, but the present inventive concepts are not limited thereto, and the storage device may be connected to a plurality of second processors 501*b* through the second storage interface 511*b*. In some example embodiments, the third storage interface 511*c* may be an interface for connecting (e.g., configured to communicatively and/or electrically couple) to the third processor 501*c*. For example, the third storage interface 511*c* may be an automotive Ethernet interface or PCIe interface for connecting the third processor 501*c*.

The interface controller 513 may be connected to the first storage interface 511*a*, the second storage interface 511*b*, the third storage interface 511*c*, and a memory interface with a non-volatile memory 520 (such that the interface controller 513 may be connected with the non-volatile memory 520). In some example embodiments, the interface controller 513 may control the connection relationship of the interface unit 510 so that the processor selected from the plurality of processors 501*a*, 501*b*, and 501*c* and the storage device 505 communicate based on the selection signal of the control unit (420 in FIG. 4). Specifically, the interface controller 513 may control the connection relationship to connect the storage interface and the memory interface corresponding to the selected processor.

In some example embodiments, where at least two of the processor interfaces 503*a*, 503*b*, or 503*c* may be different communication interfaces corresponding to (e.g., configured to implement) communication of the respective processor with an external device according to different methods (e.g., according to different communication architectures), a corresponding at least two of the plurality of storage interfaces 511*a*, 511*b*, or 511*c* may be different communication interfaces corresponding to (e.g., configured to implement) communication of with respective connected processor interfaces 503*a*, 503*b*, or 503*c* via the respective different methods, for example different communication architectures. For example, the first storage interface 511*a* may correspond to a same first communication architecture as the first processor interface 503*a* (e.g., both the first storage interface 511*a* and the first processor interface 503*a* may be a USF interface or a PCIe interface) and thus may be configured to connect with the first processor interface 503*a* and enable the storage device 505 to communicate with the first processor 501*a* via a first method corresponding to a first communication architecture (e.g., be configured to communicate with the first processor 501*a* via PCIe communication), while the second storage interface 511*b* may correspond to a same second communication architecture as the second processor interface 503*b* (e.g., both the second storage interface 511*b* and the second processor interface 503*b* may be a serial peripheral interface (SPI) or an Extended SPI (xSPI) interface) and thus may be configured to connect with the second processor interface 503*b* and enable the storage device 505 to communicate with the second processor 501*b* via a second method corresponding to a second communication architecture (e.g., be configured to communicate with the second processor 501*b* via SPI communication) which is a different method than the first method.

In some example embodiments, the storage device 505 includes at least one non-volatile memory 520, for example a plurality of dies or chips including a memory cell array. For example, the non-volatile memory 520 may include a plurality of chips, and each of the plurality of chips may include a plurality of dies. In some example embodiments, the non-volatile memory 520 may also include a plurality of channels, each of which includes a plurality of chips. The non-volatile memory 520 may include a NAND flash memory. In some example embodiments, the non-volatile memory 520 may include an electrically erasable programmable read-only memory (EEPROM), a phase change random access memory (PRAM), a resistive RAM (ReRAM), a resistance random access memory (RRAM), a nano floating gate memory (NFGM), a polymer random access memory (PoRAM), a magnetic random access memory (MRAM), a ferroelectric random access memory (FRAM), or a similar memory. While the storage device 505 is shown to include a single non-volatile memory 520, it will be understood that example embodiments are not limited thereto and the storage device 505 may include a plurality of non-volatile memories 520, and it will be understood that any description herein with regard to a non-volatile memory 520 may apply equally to a plurality of non-volatile memories 520. Hereinafter, in the present inventive concepts, the non-volatile memory 520 will be described assuming that it is a NAND flash memory device.

It will be understood that the storage device 505 may be configured to enable the plurality of processors 501*a*, 501*b*, and 501*c* to execute one or more functions (e.g., to control separate, respective functional devices of a vehicle) based on using data stored at one or more memory cells of one or more memory cell arrays of the non-volatile memory 520. Accordingly, the non-volatile memory 520 may be considered to be connected (e.g., communicatively and/or electrically coupled) to the plurality of processors 501*a*, 501*b*, and 501*c* via separate, respective storage interfaces 511*a*, 511*b*, and 511*c*. It will be understood that, in some example embodiments, the plurality of processors 501*a*, 501*b*, and 501*c* are connected to the same storage device 505 and are not connected to different storage devices 505, such that the plurality of processors 501*a*, 501*b*, and 501*c* share the storage device 505 and the non-volatile memory 520 thereof.

In some example embodiments, at least two processors of the plurality of processors 501*a*, 501*b*, and 501*c* may be configured to operate using a same one or more units of data (herein referred to herein as shared data) that may be stored at a particular one or more memory cells of the non-volatile memory 520, and the storage device 505 may be configured to communicate the same one or more units of data stored at the particular one or more memory cells of the non-volatile memory 520 to the at least two processors of the plurality of processors 501*a*, 501*b*, and 501*c* via respective (e.g., different) methods via respective storage interfaces 511*a*, 511*b*, or 511*c*. As a result, the shared data may be stored at one set of one or more memory cells at a single storage device 505 that may be connected to each of the at least two processors 501*a*, 501*b*, or 501*c* that are configured to use such shared data, instead of the shared data being duplicated across multiple sets of memory cells, multiple separate storage devices, or the like. For example, the storage device 505 may map logical block addresses received from at least two of the plurality of processors 501*a*, 501*b*, and 501*c* (e.g., a first logical block address received form the first processor 501*a* and a second logical block address received from the second processor 501*b*) to separate, respective physical addresses of the non-volatile memory 520 (e.g., a first physical address of the non-volatile memory 520 and a second physical address of the non-volatile memory 520) using respective address mapping tables corresponding to respective processors. In some example embodiments, the storage device 505 may map logical block addresses received from at least two of the plurality of processors 501*a*, 501*b*, and 501*c*, via respective mapping tables, to at least one same physical address at which data (e.g., shared data) is stored in the non-volatile memory 520. For example, the first and second physical addresses may include a same physical address of at least one memory cell of the non-volatile memory 520. As a result, the storage device 505 may utilize respective mapping tables of at least two of the processors 501*a*, 501*b*, and 501*c* to communicate shared data stored at a same particular set of one or more physical addresses (e.g., one or more particular memory cells) of the non-volatile memory 520 to the at least two processors 501*a*, 501*b*, or 501*c* according to different methods, thereby enable at least two different processors 501*a*, 501*b*, or 501*c* to execute respective functions using a single set of shared data stored at the non-volatile memory 520 of a single storage device 505.

As a result, the storage device 505 may mitigate a problem of storing the shared data used by a plurality of processors 501*a*, 501*b*, and 501*c* at separate, respective storage devices that are not each connected to the plurality of processors 501*a*, 501*b*, and 501*c* via separate, respective storage interfaces 511*a*, 511*b*, and 511*c*. Based on enabling the plurality of processors 501*a*, 501*b*, and 501*c* to share the storage device 505 (and non-volatile memory 520) instead of being connected to separate, respective storage devices, and in some example embodiments enabling a plurality of processors to function based on using a same one or more units of data (e.g., shared data) stored at the storage device, excessively redundant storage of the shared data at multiple sets of memory cells, storage devices, memories, or the like in the central controller 300 reduced, minimized, or prevented, and thus storage device utilization in the central controller 300 and any device including same (e.g., a vehicle) may be improved. Thereby, storage capacity of the central controller 200 and any device including same (e.g., a vehicle) may be improved. In addition, based on configuring the central controller 200 to have a single storage device 205 configured to be connected to the plurality of processors 501*a*, 501*b*, and 501*c* and to communicate independently with each of the processors (e.g., via different methods, communication architectures, etc.), and in some example embodiments using shared data from a same non-volatile memory 520 (e.g., same one or more memory cells) of the storage device 505 in communications to different processors 501*a*, 501*b*, and 501*c* to enable the different processors 501*a*, 501*b*, and 501*c* to execute different functions (e.g., control different functional devices), capital costs (e.g., billing of material costs) and complexity of a device including the storage device 505 may be reduced. Additionally excess power consumption associated with storing shared data in multiple separate processors may be reduced, and the like. As a result, the functionality of a device including the storage device 505 (e.g., storage capacity, memory cell utilization without excess and unnecessary redundancy, power consumption efficiency) and/or the costs thereof (e.g., manufacturing costs) may be improved. It will also be understood that a storage device configured to enable communication with a plurality of processors 501*a*, 501*b*, and 501*c* according to different methods (e.g., different communication architectures) using data stored in a same non-volatile memory 520 (which may include shared data) may improve versatility (and reduce complexity) of a device including the storage device 505 based on the storage device 505 being configured to communicate with multiple different processors according to different communication architectures instead of providing a separate storage device for each separate communication architecture and/or processor.

FIG. 6 illustrates an interface unit and a processor connected to the interface unit according to some example embodiments.

Specifically, FIG. 6 illustrates a plurality of fourth processors 650*a*, 650*b*, and 650*c* and an interface unit 610 of a storage device connected to the plurality of fourth processors 650*a*, 650*b*, and 650*c*. The plurality of fourth processors 650*a*, 650*b*, and 650*c* may be disposed on separate substrates, respectively. The storage device may be disposed on a substrate different from the separate substrates.

In some example embodiments, the plurality of processors 650*a*, 650*b*, and 650*c* may be zone controllers. The plurality of fourth processors 650*a*, 650*b*, and 650*c* may be connected to the storage device through zone interfaces 651a, 651b, and 651c. For example, the zone interface may be an Ethernet interface.

The interface unit 610 may include a fourth storage interface 611 and an interface controller 613 for controlling the fourth storage interface 611. In some example embodiments, the fourth storage interface 611 and the zone interfaces 651a, 651b, and 651c may communicate through an Ethernet network. Meanwhile, the present inventive concepts are not limited thereto, and the fourth storage interface 611 and the zone interfaces 651a, 651b, and 651c may communicate through networks such as local interconnect network (LIN), FlexRay, media oriented systems transport (MOST), and/or low-voltage differential signaling (LVDS).

The interface controller 613 may be connected to the fourth storage interface 611 and the memory interface. In some example embodiments, the interface controller 613 may control the connection relationship of the interface unit 610 so that the fourth processor selected from the plurality of fourth processors 650a, 650b, and 650c and the storage device communicate based on the selection signal of the control unit (420 in FIG. 4). Specifically, the interface controller 613 may control the connection relationship so that the fourth storage interface 611 connects the selected fourth processor and the memory interface.

It will be understood that at least the interface unit 610 may be included in a central controller similarly to the central controllers 200 and/or 300, and the interface unit 610 may be included in a storage device that includes a non-volatile memory similarly to storage devices 205, 305, 40, and/or 505. It will be understood that such a storage device may be configured to enable communication with at least the plurality of processors 650a, 650b, and/or 650c according to different methods and/or using a same unit of data stored in a non-volatile memory of the storage device, and thus provide improvements to a device including same (including for example a central controller in a vehicle) as described herein with regard to storage devices 205, 305, 40, and/or 505 and communications thereof with a plurality of processors.

Figure 7:
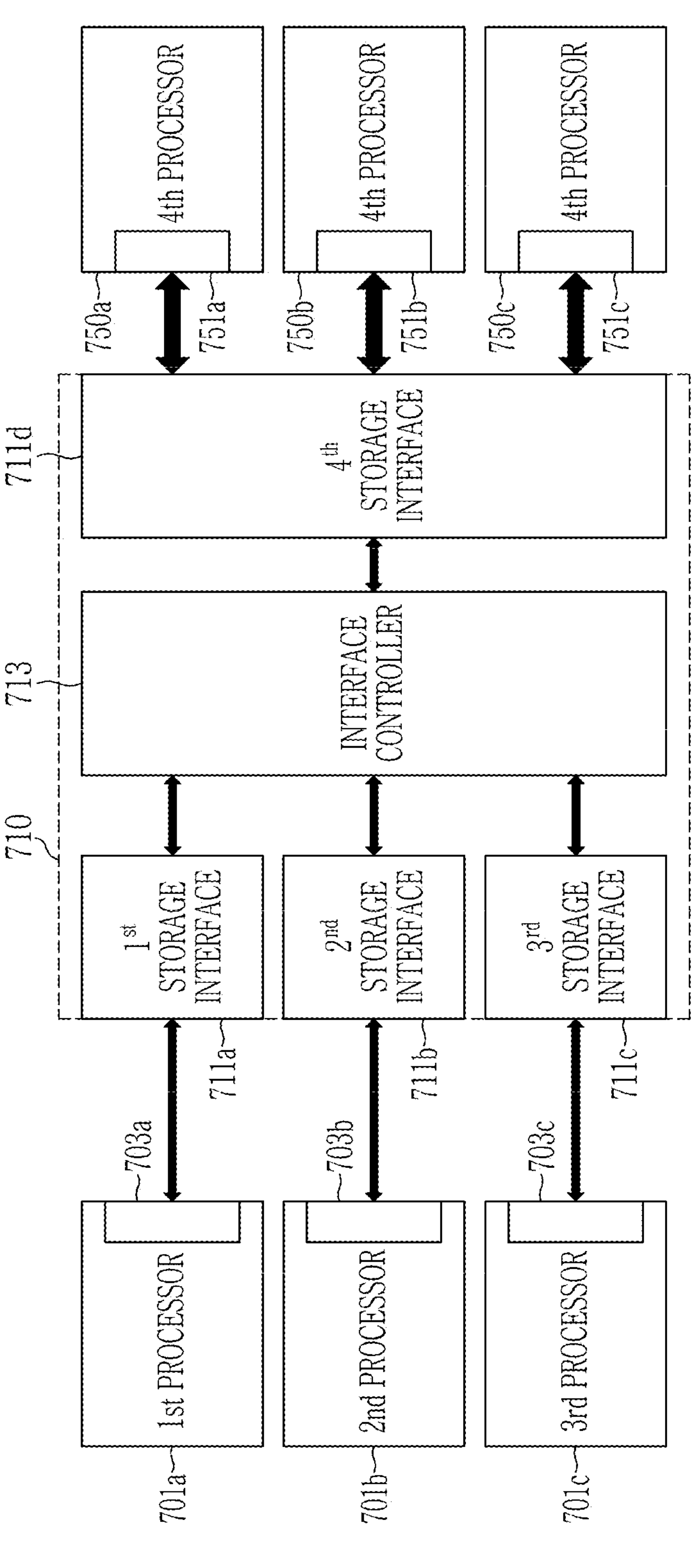
FIG. 7 illustrates an interface unit and a processor connected to the interface unit according to some example embodiments.

FIG. 7 illustrates an interface unit and a processor connected to the interface unit according to some example embodiments.

Specifically, FIG. 7 illustrates a plurality of processors 701a, 701b, 701c, 750a, 750b, and 750c, and an interface unit 710 of a storage device connected to the plurality of processors 701a, 701b, 701c, 750a, 750b, and 750c. The plurality of processors 701a, 701b, and 701c and the storage devices may be disposed on one substrate. The plurality of processors 750a, 750b, and 750c may be disposed on separate substrates, respectively. In some example embodiments, the plurality of processors 750a, 750b, and 750c may be zone controllers.

In some example embodiments, the first processor 701a may be an SoC processor. The first processor 701a may be connected (e.g., communicatively and/or electrically coupled) to the storage device through a first processor interface 703a. For example, the first processor interface 703a may be a UFS interface, a PCIe interface, or the like.

In some example embodiments, the second processor 701b may be a micro control unit (MCU). The second processor 701b may be connected (e.g., communicatively and/or electrically coupled) to the storage device through a second processor interface 703b. For example, the second processor interface 703b may be a serial peripheral interface (SPI) or an extended SPI (xSPI).

In some example embodiments, the third processor 701c may be an application processor (AP). The third processor 701c may be connected (e.g., communicatively and/or electrically coupled) to the storage device through a third processor interface 703c. For example, the third processor interface 703c may be an automotive Ethernet interface, a PCIe interface, or the like.

The plurality of fourth processors 750a, 750b, and 750c may be connected to the storage device through zone interfaces 751a, 751b, and 751c. For example, the zone interfaces 751a, 751b, and 751c may be Ethernet interfaces.

The interface unit 710 may include a first storage interface 711a, a second storage interface 711b, a third storage interface 711c, a fourth storage interface 711d, and an interface controller 713 for controlling (e.g., configured to control) the storage interfaces 711a, 711b, 711c, and 711d. In some example embodiments, the first storage interface 711a may be an interface for connecting (e.g., configured to communicatively and/or electrically couple) to the first processor 701a. For example, the first storage interface 711a may be a UFS interface or a PCIe interface. In some example embodiments, the second storage interface 711b may be an interface for connecting (e.g., configured to communicatively and/or electrically couple) to the second processor 701b. For example, the second storage interface 711b may be an SPI interface. In some example embodiments, the third storage interface 711c may be an interface for connecting (e.g., configured to communicatively and/or electrically couple) to the third processor 701c. For example, the third storage interface 711c may be an automotive Ethernet interface or a PCIe interface. In some example embodiments, the fourth storage interface 711d may be an Ethernet interface for connecting the fourth processors 750a, 750b, and 750c.

The interface controller 713 may be connected to the first storage interface 711a, the second storage interface 711b, the third storage interface 711c, the fourth storage interface 711d, and the memory interface. In some example embodiments, the interface controller 713 may control (e.g., may be configured to control) the connection relationship of the interface unit 710 so that the processor selected from the plurality of processors 701a, 701b, 701c, 750a, 750b, and 750c and the storage device (40 in FIG. 4) communicate based on the selection signal of the control unit (420 in FIG. 4). Specifically, the interface controller 713 may control the connection relationship to connect the storage interface and the memory interface corresponding to the selected processor.

Meanwhile, FIG. 7 illustrates that the storage device is connected to three fourth processors 750a, 750b, and 750c, but the present inventive concepts is not limited thereto, and the storage device may be connected to any number of fourth processors.

It will be understood that at least the plurality of processors 701a, 701b, and 701c, and the interface unit 710 may be included in a central controller similarly to the central controllers 200 and/or 300, and the interface unit 710 may be included in a storage device that includes a non-volatile memory similarly to storage devices 205, 305, 40, and/or 505. It will be understood that such a storage device may be configured to enable communication with at least the plurality of processors 701a, 701b, and 701c (and in some example embodiments, the plurality of fourth processors 750a, 750b, and 750c) according to different methods and/or using a same unit of data stored in a non-volatile memory of the storage device, and thus provide improvements to a device including same (including for example a central controller in a vehicle) as described herein with regard to storage devices 205, 305, 40, and/or 505 and communications thereof with a plurality of processors.

FIG. 8 illustrates an operation method of a system according to FIG. 7 according to some example embodiments.

The interface controller 713 may receive first data from the first processor 701*a*, for example as a first data write command transmitted by the first processor 701*a* (S801). The interface controller 713 may receive second data from the second processor 701*b*, for example as a second data write command transmitted by the second processor 701*b* (S803). The interface controller 713 may receive third data from the third processor 701*c*, for example as a third data write command transmitted by the third processor 701*c* (S805). The interface controller 713 may receive fourth data from the fourth processor 750*a*, for example as a fourth data write command transmitted by the fourth processor 750*a* (S807).

FIG. 8 illustrates that a plurality of data (e.g., a plurality of units of data) are sequentially received, but the interface controller 713 may simultaneously receive data (e.g., separate, respective units of data) from each of the plurality of processors 701*a*, 701*b*, 701*c*, and 750*a*.

The interface controller 713 may determine a processing order of the received data (S809).

In some example embodiments, the interface controller 713 may determine the processing order based on a determination of the importance of the data. For example, the interface controller 713 may determine to first process data received through an interface with a high communication speed (e.g., to process data received through an interface with a high communication speed prior to processing data received through an interface having a lower communication speed). The communication speed of respective interfaces may be determined based on accessing a memory to determine respective particular communication architectures and/or communication speeds associated with the respective interfaces.

For example, the interface controller 713 may communicate with the first processor 701*a* through a UFS interface, communicate with the second processor 701*b* through an SPI, communicate with the third processor 701*c* through a PCIe interface, and communicate with the fourth processor 750*a* through an Ethernet interface. In some example embodiments, data transmission speed may be slowed in the order of an Ethernet interface, a PCIe interface, a UFS interface, and an SPI. The interface controller 713 may determine the processing order in the order of the fourth data, the third data, the first data, and the second data based on the data communication speed (e.g., processing data received from the fourth processor 750*a* prior to processing data received from any of the first to third processors 701*a* to 701*c*, processing data received from the third processor 701*c* prior to processing data received from the first or second processors 701*a* or 701*b*, processing data received from the first processor 701*a* prior to processing data received from the second processor 701*b*, etc.).

The interface controller 713 may transmit data to the memory interface (450 in FIG. 4) based on the determined processing order.

The interface controller 713 may transmit the fourth data (e.g., fourth data received at S807) to the memory interface (450 in FIG. 4) (S811). The control unit (420 in FIG. 4) may write the fourth data to the non-volatile memory (403 in FIG. 4), for example based on the fourth data being transmitted to the memory interface at S811. After writing the fourth data to the non-volatile memory (403 in FIG. 4), the control unit (420 in FIG. 4) may generate a response to the write command. The interface controller 713 may transmit the response to the fourth data write command to the fourth processor 750*a* (S813).

The interface controller 713 may transmit the third data (e.g., third data received at S805) to the memory interface (450 in FIG. 4) (S815). The control unit (420 in FIG. 4) may write the third data to the non-volatile memory (403 in FIG. 4), for example based on the third data being transmitted to the memory interface at S815. After writing the third data to the non-volatile memory (403 in FIG. 4), the control unit (420 in FIG. 4) may generate a response to the write command. The interface controller 713 may transmit the response to the third data write command to the third processor 701*c* (S817).

The interface controller 713 may transmit the first data (e.g., first data received at S801) to the memory interface (450 in FIG. 4) (S819). The control unit (420 in FIG. 4) may write the first data to the non-volatile memory (403 in FIG. 4), for example based on the first data being transmitted to the memory interface at S819. After writing the first data to the non-volatile memory (403 in FIG. 4), the control unit (420 in FIG. 4) may generate a response to the write command. The interface controller 713 may transmit the response to the first data write command to the first processor 701*a* (S821).

The interface controller 713 may transmit the second data (e.g., second data received at S803) to the memory interface (450 in FIG. 4) (S823). The control unit (420 in FIG. 4) may write the second data to the non-volatile memory (403 in FIG. 4). After writing the second data to the non-volatile memory (403 in FIG. 4), for example based on the second data being transmitted to the memory interface at S823, the control unit (420 in FIG. 4) may generate a response to the write command. The interface controller 713 may transmit the response to the second data write command to the second processor 701*b* (S825).

FIG. 8 illustrates that the interface controller 713 may process data in the order of the fourth data, the third data, the first data, and the second data, but the present inventive concepts are not limited thereto. In some example embodiments, the order of processing data may be determined based on the speed of each interface connected to a plurality of processors, response time, communication delay, importance of received data, and the like.

FIG. 9 illustrates a block diagram of a vehicle according to some example embodiments.

As shown in FIG. 9, a vehicle 90 may include an image sensor 901, a user interface 902, a light detection and ranging (LIDAR) sensor 903, a radio detection and ranging (RADAR) sensor 904, a natural processing unit (NPU) 905, a CPU 906, an electronic control unit (ECU) 907, and a storage device 911, and the ECU 907 may receive a steering angle of the vehicle and a speed of the vehicle from a steering wheel 908 and an engine 909. In addition, although not shown, the vehicle 90 may further include a communication module, an input/output module, a security module, a power control device, and the like, and may further include various types of control devices.

Here, the storage device 911 may be a storage device described with reference to any of FIG. 2 to FIG. 8.

In some example embodiments, the vehicle 90 may detect an object using information about an external environment obtained through sensors (for example, the image sensor 901, the LIDAR sensor 903, and/or the RADAR sensor 904). The sensors 901, 903, and 904 may capture an object, and measure a distance to the object to transmit it to processors (for example, the CPU 906, the NPU 905, and the ECU 907). In order for the sensors 901, 903, and 904 to detect objects, in addition to the mentioned sensors, a time of flight (ToF) sensor, an ultrasonic wave sensor, an infrared sensor, a magnetic sensor, a position sensor (for example, GPS), and an acceleration sensor, an atmospheric pressure sensor, a temperature/humidity sensor, a proximity sensor, and a gyroscope sensor may be further used.

The image sensor 901 may provide an image or light sensing, and may be, for example, a complementary metal-oxide-semiconductor (CMOS) image sensor. The image sensor 901 may obtain image or visual information about an object. For example, the image sensor 901 may be attached to the front of the vehicle to capture a driving image or measure a distance to an object positioned in front of the vehicle. The position to which the image sensor 901 is attached is not limited thereto, and the image sensor 901 may be attached to various positions to achieve a purpose of obtaining information about an object.

The image sensor 901 may capture a surrounding environment of the vehicle 90. The vehicle 90 may include at least two image sensors to capture images around the vehicle in 360 degrees. In some example embodiments, the image sensor 901 may be equipped with a wide-angle lens. In some example embodiments, four image sensors of the front, rear, left, and right sides of the vehicle may be included in the vehicle 90, but the present inventive concepts are not limited thereto, and the surrounding environment of the vehicle may be captured with a single image sensor 901. The image sensor 901 may continuously provide information on the vehicle surrounding environment to the vehicle 90 by continuously capturing the vehicle surrounding environment.

The image sensed by the image sensor 901 may be processed by the CPU 906 and/or the NPU 905. The CPU 906 may detect objects by processing the sensed image in a movement-based scheme, and the NPU 905 may detect objects by processing the sensed image in a shape-based scheme. The image sensor 901 may be attached to the front of the vehicle to sense the external environment in front of the vehicle, but is not limited thereto and may be attached to various positions of the vehicle to sense the external environment.

The user interface 902 may include various electronic and mechanical devices included in the driver's seat side or passenger's seat side, such as a vehicle instrument panel, a display showing driving information, a navigation system, and an air conditioning system.

The LIDAR sensor 903 can measure a distance to an object by emitting a laser pulse and receiving the laser reflected from the target object. The LIDAR sensor 903 may substantially include a laser, a scanner, a receiver, and a positioning system. Light in the wavelength band of 600 to 1000 nm is generally used for the laser, but this may vary depending on the application. The scanner may quickly obtain information about the surrounding environment by scanning the sensed surrounding environment, and there may be various types of scanners using a plurality of mirrors. The receiver may receive the laser pulse reflected by the target object, and may detect and amplify photons from the laser pulse. The positioning system may check the position coordinates and direction of a device equipped with a receiver to implement 3D images. The LIDAR sensor 903 and the RADAR sensor 904 may be classified according to the effective measurement distance.

The RADAR sensor 904 may emit electromagnetic waves and receive electromagnetic waves reflected from the target object to measure the distance to the object, identify the object, and measure the position and moving speed of the object. The RADAR sensor 904 may include a transmitter and a receiver. The transmitter may generate and output electromagnetic waves, and the receiver may process the signal by receiving echo waves reflected from the target object. The RADAR sensor 904 may transmit and receive through one antenna, but is not limited thereto. The frequency band of the electromagnetic wave used in the RADAR sensor 904 is a radio wave or a microwave band, but may be changed depending on the purpose. In some example embodiments, the LIDAR sensor 903 and the RADAR sensor 904 may be attached to a vehicle to assist in determining the relative positional relationship between the vehicle and an object of interest.

The NPU 905 may receive input data, perform calculations using an artificial neural network, and provide output data based on the calculation results. The NPU 905 may be a processor optimized for simultaneous matrix operations, may process multiple operations in real time, and may derive an optimal value by self-learning based on accumulated data. The NPU 905 may be optimized for simultaneous matrix operations to process multiple operations in real time, and may self-learn based on accumulated data to derive a local-maximum in the current driving parameter.

In some example embodiments, the NPU 905 may be a specialized processor to perform a deep-learning algorithm. For example, the NPU 905 may be a specialized processor to perform a deep-learning algorithm. For example, the NPU 905 may process computation based on various types of networks, such as a convolution neural network (CNN), a region with convolution neural network (R-CNN), a region proposal network (RPN), a recurrent neural network (RNN), a fully convolutional network, a long short-term memory (LSTM) network, and a classification network. However, it is not limited thereto, and various types of computational processing that mimic human neural networks are possible.

The NPU 905 may receive a driving image from the image sensor 901 and perform shape-based object detection based on the driving image. The NPU 905 may respectively classify a plurality of objects from the driving image by extracting features of the plurality of objects and self-learning based on the accumulated data. For example, the NPU 905 may extract objects that are determination criteria for driving, such as vehicles, pedestrians, traffic lights, and lanes, from a single driving image based on the features determined by using the accumulated data as training data.

The CPU 906 controls all operations of the vehicle 90. The CPU 906 may include a single processor core (Single Core) or a plurality of processor cores (Multi-Core). The CPU 906 may process or execute programs and/or data stored in a memory. For example, the CPU 906 may control the functions of the NPU 905 and the ECU 907 by executing the programs stored in the memory.

The CPU 906 may obtain a steering angle and a vehicle speed from the ECU 907. The steering angle may be determined by the manipulation of the steering wheel 908 by a driver, and may be processed by the ECU 907 a, which controls an operation of a steering control device, and provided to the CPU 906. The vehicle speed may be measured based on at least one of the driver's pedaling (for example, an operation of an accelerator), a rotation speed of the engine 909, or a wheel speed measured by a wheel sensor, and it may be processed by the ECU 907, which controls the vehicle speed to be provided to the CPU 906.

In addition, the CPU 906 may determine a relative positional relationship between the vehicle and the nearby vehicle, and generate an instruction to maintain the number of revolutions of the engine 909 so that the vehicle may be driven at a constant speed to maintain a constant distance from the nearby vehicle according to a predetermined driving plan. When a distance between the vehicle and the nearby vehicle is less than or equal to a critical distance or when the nearby vehicle is a cut-in object, the CPU 906 may generate an instruction to adjust the steering wheel 908 left or right and change the steering angle to cause the vehicle to perform an evasive maneuver. Although the steering wheel 908 and the engine 909 illustrated in FIG. 9 are disclosed as components related to the steering angle and the vehicle speed, the present inventive concepts are not limited thereto, and the steering angle and the vehicle speed may be determined by using various components of the vehicle.

The CPU 906 may detect an object using the movement-based scheme from the driving image. The movement-based scheme may be a method of determining a relative movement by detecting a degree of movement of an object over time. The driving image may be continuously obtained for each frame by using the image sensor 901. For example, an image of each frame may be captured at a speed of about 60 frame per second (fps), and thus, the CPU 906 may detect movement between image frames, which is obtained every 1/60 second, over time. The movement-based scheme may include optical flow, which indicates a distribution of movement vectors of the object.

In addition to the image sensor 901, the CPU 906 may stably maintain a driving state of the vehicle by assistively using the distance from the object, which is obtained from the LIDAR sensor 903. In addition, the CPU 906 may generate an instruction to adjust inner and outer states of the vehicle according to the manipulation of the user interface 902 by a driver.

The ECU 907 may be an electronic control device provided to completely or partially control an operation of the vehicle. The ECU 907 may control an operation of a combustion engine and an operation of at least one electric motor through a controller area network (CAN) multiplexing bus, and it may control an operation of the vehicle based on parameters of the vehicle according to the control of a semi-automatic gearbox (SAGB) or an automatic gearbox (AGB) and other drivers.

The ECU 907 may electronically control an engine of the vehicle, an actuator of a steering control device, a transmission control system, an anti-lock brake system, and an airbag control system with a computer, and it may provide the vehicle speed to the vehicle 90 based on an engine rotation speed or a wheel speed measured by a wheel sensor and provide the steering angle of the vehicle from the steering control device to the vehicle 90.

In some example embodiments, the ECU 907 may adjust states of the steering wheel 908 and the engine 909 based on instructions generated from the CPU 906 and the NPU 905. In some example embodiments, the ECU 907 may accelerate or decelerate the vehicle in response to the instructions generated by the CPU 906 and the NPU 905, and provide a signal for increasing or decreasing an engine rotation speed to the engine 909 so as to accelerate/decelerate the vehicle. Furthermore, when a distance between the vehicle and the nearby vehicle is less than or equal to a critical distance according to a predetermined driving plan or when the nearby vehicle is a cut-in object, the ECU 907 may turn the steering wheel 908 left or right to perform an evasive maneuver.

The ECU 907 is illustrated as being provided in the vehicle separately from the CPU 906, but the present inventive concepts are not limited thereto, and a vehicle control function of the ECU 907 may be included in the CPU 906 and performed together by the CPU 906, and in this case, the CPU 906 may be interpreted as including at least two processor cores (or a Multi-core). In FIG. 9, the ECU 907 is illustrated as a separate component from the CPU 906, but is not limited thereto, and may be included in the CPU 906.

In some example embodiments, the storage device 911 may include different interfaces. The storage device 911 may be connected to a plurality of processors including different interfaces which may be interfaces configured to communicate with respective external devices via separate, respective (e.g., same or different) communication architectures. For example, the storage device 911 may be connected to the CPU 906 and the ECU 907. The storage device 911 may receive data from each of the CPU 906 and the ECU 907 and store the received data. Although not illustrated in FIG. 9, the storage device 911 may be connected to a plurality of processors (for example, the zone controllers or the like) in the vehicle 90. Since the plurality of processors share the storage device 911, data (e.g., shared data as described herein) may be shared (e.g., stored at one or more particular memory cells of a non-volatile memory of the storage device 911 and communicated to multiple separate processors via separate, respective interfaces and corresponding methods) without storing necessary data multiple times. For example, ADAS maps and sensor data that need to be shared between processors may be efficiently shared. Accordingly, since there is no need to include the storage device 911 for each processor, the complexity of the system of the vehicle 90 may be reduced, and the billing of material (BOM) cost may also be reduced. Accordingly, the ECU 907 may control the operation of the vehicle 90 based on the data stored in the storage device 911.

Although not illustrated in FIG. 9, the vehicle 90 may further include a communication module. The communication module may transmit data to the outside of the vehicle 90 or receive data from the outside. For example, the communication module may perform communication with an external target of the vehicle 90. In this case, the communication module may perform communication in a vehicle to everything (V2X) method. For example, the communication module may perform communication in vehicle to vehicle (V2V), vehicle to infrastructure (V21), vehicle to pedestrian (V2P), and vehicle to nomadic devices (V2N) methods. However, it is not limited thereto, and the communication module may transmit and receive data through various known communication methods. For example, the communication module may perform communication by 3G, 4G (LTE), 5G, Wi-Fi, Bluetooth, Bluetooth low energy (BLE), Zigbee, near field communication (NFC), and ultrasonic communication methods, and may include both short-range and long-range communication.

Figure 10A:
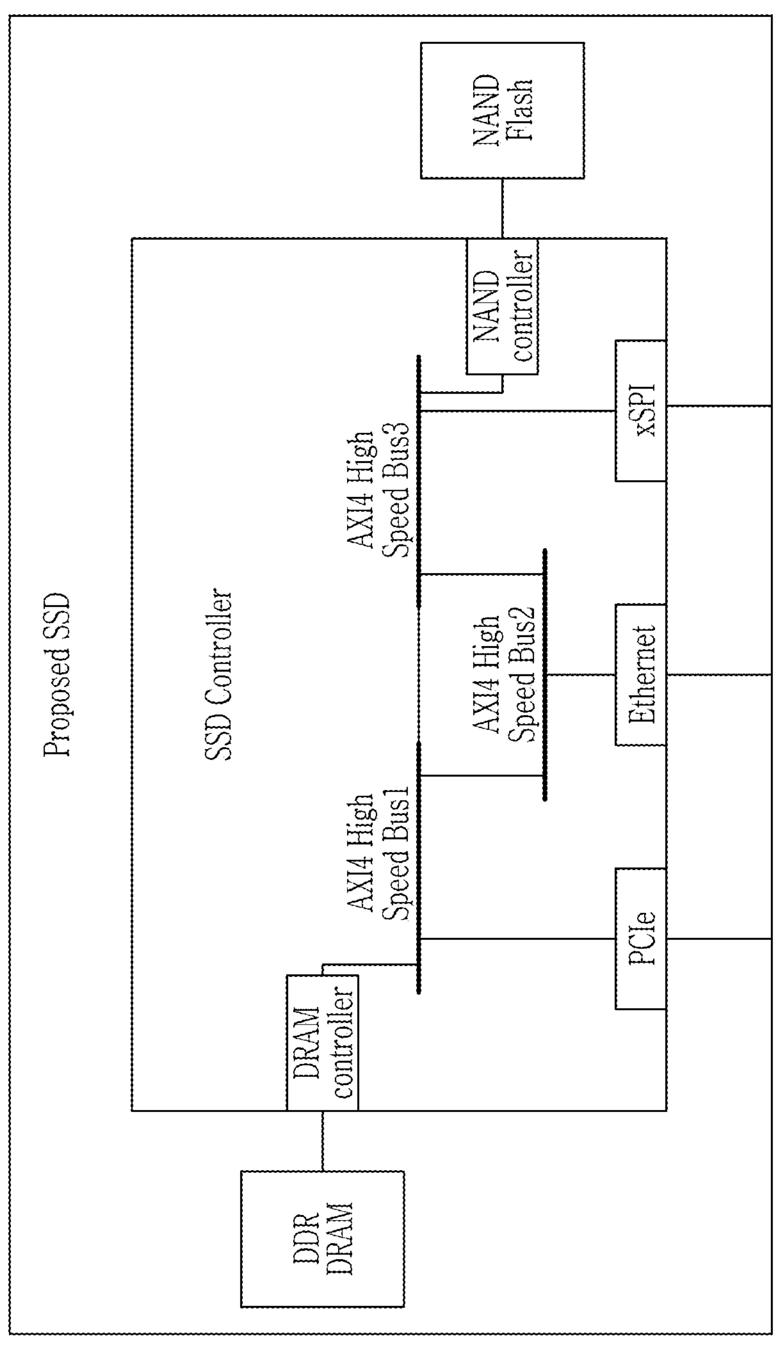
FIG. 10A illustrates a storage device according to some example embodiments.
Figure 10B:
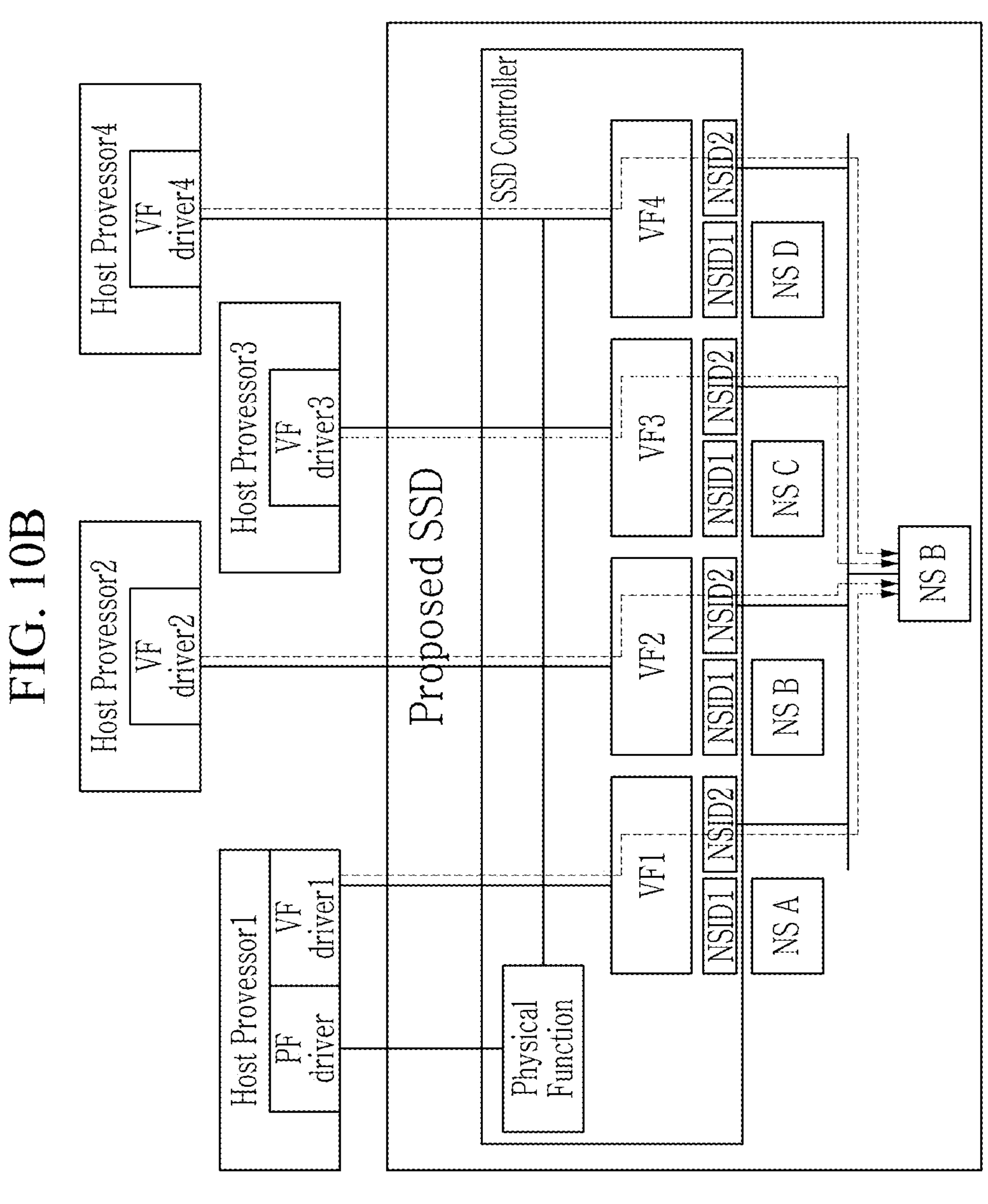
FIG. 10B illustrates a storage device and a plurality of processors according to some example embodiments.

FIG. 10A illustrates a storage device, according to some example embodiments. FIG. 10B illustrates a storage device and a plurality of processors according to some example embodiments.

The storage device is labeled in FIG. 10A and FIG. 10B as a Proposed SSD, but example embodiments are not limited thereto. The Proposed SSD in FIGS. 10A and 10B may implement any of the storage devices according to any of the example embodiments, including for example any of the storage devices 205, 305, 40, 505, or the like. The SSD controller shown in FIGS. 10A and 10B may be referred to as a controller of the storage device. Such a controller may implement any of the controllers and/or units according to any of the example embodiments, including for example any of the interface controllers 413, 513, 613, or 713, interface units 410, 510, 610, or 710, storage controller 401, control unit 420, any combination thereof, or the like.

The combination of the storage device ("proposed SSD") and the plurality of processors (Host Processor 1 to Host Processor 4) in FIG. 10B may at least partially comprise a central controller according to any of the example embodiments, including for example the central controller 100, 200, 300, or the like. It will be understood that the storage device (Proposed SSD) may include a plurality of storage interfaces corresponding to any of the storage interfaces according to any of the example embodiments, including for example the storage interfaces shown in FIG. 10A, any of FIGS. 2 to 7, or the like, and the Host processors may include respective processor interfaces connected to separate, respective storage interfaces of the storage device corresponding to any of the example embodiments.

Referring to FIG. 10A, in some example embodiments, a controller of the storage device (e.g., the SSD controller shown in FIG. 10A) may include multiple high-speed bus Advanced extensible Interfaces (AXIs), for example AXI4 High Speed Busses 1 to 3 as shown, and each AXI may be connected to a separate one of a PCIe peripheral, an Ethernet peripheral, or an xSPI peripheral, which may correspond to separate, respective storage interfaces of the storage device according to any of the example embodiments (e.g., storage interfaces 207*a* to 207*c*). As shown, the storage device (Proposed SSD) may include a DDR DRAM which may implement a buffer memory of the storage device according to any of the example embodiments (e.g., the DDR DRAM shown in FIG. 10A may implement the buffer memory 440 of the storage device 40, and the controller (SSD Controller) may include a DRAM controller connected to the DDR DRAM and further connected to an AXI, for example AXI4 High Speed Bus 1. As shown, the storage device (Proposed SSD) may include a NAND Flash which may implement a non-volatile memory of the storage device according to any of the example embodiments (e.g., the NAND Flash shown in FIG. 10A may implement the non-volatile memory 220, 320, 403, 520, or the like and the controller (SSD Controller) may include a NAND controller connected to the NAND Flash and further connected to an AXI, for example AXI4 High Speed Bus 3. Accordingly, the controller (SSD controller) of the storage device (Proposed SSD) according to any of the example embodiments may be configured to implement communications with separate, respective processors connected to different ones of the storage interfaces (e.g., a separate one of a PCIe peripheral, an Ethernet peripheral, or an xSPI peripheral) via separate, respective communication methods (e.g., different communication architectures, for example via PCIe communication, Ethernet communication, or xSPI communication, respectively).

Referring to FIG. 10B, in some example embodiments, a controller of the storage device (e.g., the SSD controller shown in FIG. 10A) may include (e.g., may be configured to implement) one Physical Function (PF) (e.g., a PCIe function that supports single root I/O virtualization (SR-IOV) capabilities) and at least one Virtual Function (VF) (e.g., a PCIe function that is associated with a physical function). For example, as shown, the controller may implement one Physical Function and Virtual Functions 1 to 4 (VF1 to VF4) corresponding to separate, respective Host Processors 1 to 4, where each separate Host Processor 1 to 4 is configured to implement a respective VF driver that, based on the Host Processor being coupled to the storage device via a respective processor interface and storage interface, may access a respective corresponding Virtual Function 1 to 4 via a respective interface as shown in any of FIGS. 2 to 7, for example.

As shown, each separate processor of a central controller (e.g., each of Host Processors 1 to 4) may access a respective corresponding Name Space (NS) through respective corresponding Virtual Function (VF) within the controller (e.g., via respective NSID1 of a respective Virtual Function). As further shown, data storing between the processors connected to the storage device (e.g., Host Processors 1 to 4) may be implemented through Name Space E (NS E), which is accessible to all of the Virtual Functions and thus is accessible to each of the processors (Host Processors 1 to 4). Accordingly, as shown, the controller may be configured to enable data sharing based on enabling each of the processors (Host Processors 1 to 4) to access the Name Space E through respective corresponding Virtual Function (VF) within the controller (e.g., via respective NSID2 of a respective Virtual Function). The various Name Spaces A to D and E as shown in FIG. 10B may be included in the controller, in one or more separate non-volatile memories of the storage device (e.g., the NAND Flash shown in FIG. 10A), or any combination thereof.

As described herein, any devices, systems, modules, portions, units, controllers, circuits, and/or portions thereof according to any of the example embodiments, and/or any portions thereof (including, without limitation, the vehicle 10, the central controller 100, the central controller 200, the plurality of processors 201*a*, 201*b*, and 201*c*, the storage device 205, the central controller 300, the plurality of processors 301*a*, 301*b*, 301*c*, and 350, the storage device 305, the storage device 40, the interface unit 410, the interface controller 413, the control unit 420, the FTL 430, the buffer memory 440, the memory interface 450, the non-volatile memory 403, the storage device 505, the interface unit 510, the plurality of processors 501*a*, 501*b*, and 501*c*, the interface controller 513, the interface unit 610, the fourth processors 650*a*, 650*b*, and 650*c*, the fourth storage interface 611, the interface controller 613, the interface unit 710, the interface controller 713, the plurality of processors 701*a*, 701*b*, 701*c*, 750*a*, 750*b*, and 750*c*, the vehicle 90, the image sensor 901, the user interface 902, the LIDAR sensor 903, the RADAR sensor 904, the CPU 906, the NPU 905, the ECU 907, the storage device 911, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, portions, units, controllers, circuits, and/or portions thereof according to any of the example embodiments.

While the present inventive concepts have been described in connection with what is presently considered to be practical example embodiments, it is to be understood that the inventive concepts are not limited to such example embodiments, but, on the contrary, the inventive concepts are intended to cover various modifications and equivalent arrangements included within the spirit and scope of the appended claims.

What is claimed is:

1. An electronic device, comprising:
a plurality of processors; and
a storage device, the storage device including
a first storage interface connected to a first processor among the plurality of processors,
a second storage interface connected to a second processor among the plurality of processors,
a non-volatile memory, and
an interface controller configured to control a connection relationship between the first storage interface, the second storage interface, and the non-volatile memory,
wherein the first processor, the second processor, and the storage device are on a first substrate,
wherein the storage device is configured to communicate with the first and second processors via different methods, such that the storage device is configured to communicate with the first processor according to a first method and to communicate with the second processor according to a second method different from the first method,
wherein the first storage interface configured to receive first data from the first processor,
wherein the second storage interface configured to receive second data from the second processor, and
wherein the interface controller is configured to determine a processing order of the first data and the second data based on respective communication speeds of the first storage interface and the second storage interface.

2. The electronic device of claim 1, wherein
the first processor includes a first processor interface,
the first processor is an SoC processor, and
the first processor interface is a UFS interface or a PCIe interface.

3. The electronic device of claim 1, wherein
the second processor includes a second processor interface,
the second processor is a micro control unit (MCU), and
the second processor interface is a serial peripheral interface (SPI) or an Extended SPI (xSPI).

4. The electronic device of claim 1, wherein
the storage device further includes a third storage interface connected to a third processor among the plurality of processors,
the third processor includes a third processor interface,
the third processor is an application processor (AP), and
the third processor interface is an automotive Ethernet interface or a PCIe interface.

5. The electronic device of claim 1, wherein
the storage device further includes a fourth storage interface connected to a fourth processor among the plurality of processors, and
the fourth processor is on a second substrate that is different from the first substrate.

6. The electronic device of claim 5, wherein
the fourth processor includes a fourth processor interface,
the fourth processor is an application processor (AP), and
the fourth processor interface is an automotive Ethernet interface or a PCIe interface.

7. The electronic device of claim 5, wherein
the electronic device is mounted on a vehicle including a plurality of zones and a zone controller configured to control devices included in the plurality of zones, respectively, and
the fourth processor is the zone controller.

8. The electronic device of claim 7, wherein
the first substrate and the second substrate are fastened to a single housing.

9. The electronic device of claim 7, wherein
the vehicle includes an electronic control unit (ECU) configured to control an operation of the vehicle based on data stored in the storage device.

10. The electronic device of claim 1, wherein
the interface controller is configured to transmit the first data and the second data to the non-volatile memory based on the processing order.

11. The electronic device of claim 6, wherein
the fourth storage interface is configured to receive fourth data from the fourth processor, and
the interface controller is configured to determine a second processing order of the first data, the second data, and the fourth data based on respective communication speeds of the first storage interface, the second storage interface, and the fourth storage interface.

12. A vehicle storage device, comprising:
a non-volatile memory; and
a storage controller, the storage controller including
a first storage interface connected to a first processor among a plurality of processors,
a second storage interface connected to a second processor among the plurality of processors and different from the first storage interface, and
an interface controller configured to control a connection relationship between the first storage interface, the second storage interface, and the non-volatile memory,
wherein the vehicle storage device is mounted on a vehicle,
wherein the first storage interface is configured to receive first data from the first processor,
wherein the second storage interface is configured to receive second data from the second processor, and
wherein the interface controller is configured to determine a processing order of the first data and the second data based on respective communication speeds of the first storage interface and the second storage interface.

13. The vehicle storage device of claim 12, wherein
the first processor, the second processor, and the vehicle storage device are on a first substrate.

14. The vehicle storage device of claim 13, wherein
the vehicle storage device further includes a fourth storage interface connected to a fourth processor among the plurality of processors, and
the fourth processor is on a second substrate that is different from the first substrate.

15. The vehicle storage device of claim 14, wherein
the vehicle includes a plurality of zones and a plurality of zone controllers, each separate zone controller of the plurality of zone controllers configured to control devices included in a separate, respective zone of the plurality of zones, and
the fourth processor is one zone controller of the plurality of zone controllers.

16. The vehicle storage device of claim 15, wherein the first substrate and the second substrate are fastened to a single housing.

17. The vehicle storage device of claim 12, wherein the storage controller further includes a flash translation layer (FTL) configured to perform an address mapping operation, based on a first mapping table that maps a first logical block address received from the first processor to a first physical address with respect to the non-volatile memory, and a second mapping table that maps a second logical block address received from the second processor to a second physical address with respect to the non-volatile memory.

18. The vehicle storage device of claim 12, wherein the first processor includes a first processor interface, the first processor is an SoC processor, and the first processor interface is a UFS interface or a PCIe interface.

19. The vehicle storage device of claim 12, wherein the second processor includes a second processor interface, the second processor is a micro control unit (MCU), and the second processor interface is a serial peripheral interface (SPI) or an Extended SPI (xSPI).

20. An operating method of a vehicle storage device, the operating method comprising:

receiving first data from a first processor among a plurality of processors according to a first method and a first storage interface;

receiving second data from a second processor among the plurality of processors according to a second method and a second storage interface, the second method different from the first method;

determining a processing order of the first data and the second data based on respective communication speeds of the first storage interface and the second storage interface; and sequentially writing the first data and the second data to a non-volatile memory based on the processing order.

* * * * *